United States Patent
Wang et al.

(10) Patent No.: US 11,025,686 B2
(45) Date of Patent: Jun. 1, 2021

(54) NETWORK CALL METHOD AND APPARATUS, TERMINAL, AND SERVER

(71) Applicant: TENCENT TECHNOLOGY (SHENZHEN) COMPANY LIMITED, Shenzhen (CN)

(72) Inventors: Jihao Wang, Shenzhen (CN); Jing Lv, Shenzhen (CN); Yongfang Shi, Shenzhen (CN); Yu Zhou, Shenzhen (CN); Jingchang Chen, Shenzhen (CN); Baojian Wang, Shenzhen (CN); Yongyu Lin, Shenzhen (CN); Jiakai Wang, Shenzhen (CN); Runjia Huang, Shenzhen (CN); Jiamin Chen, Shenzhen (CN); Jin Huang, Shenzhen (CN); Hongfa Qiu, Shenzhen (CN); Junshan Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 68 days.

(21) Appl. No.: 15/870,217

(22) Filed: Jan. 12, 2018

(65) Prior Publication Data

US 2018/0139252 A1 May 17, 2018

Related U.S. Application Data

(63) Continuation of application No. PCT/CN2016/098976, filed on Sep. 14, 2016.

(30) Foreign Application Priority Data

Sep. 23, 2015 (CN) .......................... 201510613392.3

(51) Int. Cl.
*G06F 3/0482* (2013.01)
*G06F 3/0484* (2013.01)
(Continued)

(52) U.S. Cl.
CPC .......... *H04L 65/403* (2013.01); *G06F 3/0482* (2013.01); *G06F 3/04847* (2013.01);
(Continued)

(58) Field of Classification Search
CPC .. G06F 3/0482; G06F 3/04847; G06F 3/0488; G06Q 50/01; G06T 2200/24;
(Continued)

(56) References Cited

U.S. PATENT DOCUMENTS

| | | | | |
|---|---|---|---|---|
| 2004/0041836 A1* | 3/2004 | Zaner | ...................... | G06Q 10/10 715/751 |
| 2006/0128411 A1* | 6/2006 | Turcanu | ................ | H04W 76/40 455/518 |

(Continued)

FOREIGN PATENT DOCUMENTS

| | | |
|---|---|---|
| CN | 1635765 A | 7/2005 |
| CN | 101345718 A | 1/2009 |

(Continued)

OTHER PUBLICATIONS

The State Intellectual Property Office of the People's Republic of China (SIPO) Office Action 2 for 201510613392.3 dated Jun. 4, 2018 8 Pages (including translation).

(Continued)

*Primary Examiner* — Jennifer N To
*Assistant Examiner* — Reji Kartholy
(74) *Attorney, Agent, or Firm* — Anova Law Group, PLLC

(57) ABSTRACT

The present disclosure provides a network call method, terminal, and server. The method includes: displaying a scenario interface for a social application group; displaying a first list of user identifiers when an instruction for initiating a specified call is received; determining, according to a selection operation in the first list of user identifiers, iden- (Continued)

tifiers of second users; sending a network call request to a social application server, the network call request comprising an identifier of the first user logging in at the first terminal locally and the identifiers of the second users, so that the social application server creates a virtual group, and adds, to the virtual group, the first terminal and second terminals corresponding to the identifiers of the second users accepting call invitations; and performing a network call in a call interface for the virtual group.

16 Claims, 18 Drawing Sheets

(51) Int. Cl.
| | |
|---|---|
| *H04L 29/06* | (2006.01) |
| *H04L 12/58* | (2006.01) |
| *H04N 7/15* | (2006.01) |
| *H04M 3/56* | (2006.01) |
| *H04M 7/00* | (2006.01) |
| *G06Q 50/00* | (2012.01) |
| *G06F 3/0488* | (2013.01) |
| *G06T 3/60* | (2006.01) |

(52) U.S. Cl.
CPC .............. *H04L 51/00* (2013.01); *H04L 51/32* (2013.01); *H04L 65/1063* (2013.01); *H04M 3/563* (2013.01); *H04M 7/006* (2013.01); *H04N 7/15* (2013.01); *H04N 7/157* (2013.01); *G06F 3/0488* (2013.01); *G06Q 50/01* (2013.01); *G06T 3/60* (2013.01); *G06T 2200/24* (2013.01); *H04M 2203/1025* (2013.01); *H04M 2203/655* (2013.01)

(58) Field of Classification Search
CPC . G06T 3/60; H04L 51/00; H04L 51/32; H04L 65/1063; H04L 65/403; H04M 2203/1025; H04M 2203/655; H04M 3/563; H04M 7/006; H04N 7/15; H04N 7/157

See application file for complete search history.

(56) References Cited

U.S. PATENT DOCUMENTS

| | | | | |
|---|---|---|---|---|
| 2007/0133439 | A1* | 6/2007 | Promenzio | H04Q 11/00 370/261 |
| 2007/0172044 | A1* | 7/2007 | Nguyen | H04L 12/1818 379/202.01 |
| 2008/0268899 | A1* | 10/2008 | Lee | H04N 5/23293 455/556.1 |
| 2010/0251158 | A1* | 9/2010 | Geppert | G06F 3/04817 715/771 |
| 2011/0310796 | A1* | 12/2011 | Um | H04N 21/4223 370/328 |
| 2017/0013233 | A1* | 1/2017 | Kuusela | H04N 19/44 |

FOREIGN PATENT DOCUMENTS

| | | | | |
|---|---|---|---|---|
| CN | 101459880 | A | | 6/2009 |
| CN | 101569164 | A | | 10/2009 |
| CN | 102348168 | A | | 2/2012 |
| CN | 103118242 | A | | 5/2013 |
| CN | 103369086 | A | | 10/2013 |
| CN | 104079860 | A | * | 10/2014 |
| CN | 104079860 | A | | 10/2014 |
| CN | 105207896 | A | | 12/2015 |
| EP | 2922004 | A1 | * | 9/2015 ............. H04L 51/04 |
| WO | 2008083085 | A1 | | 7/2008 |

OTHER PUBLICATIONS

The World Intellectual Property Organization (WIPO) International Search Report for PCT/CN2016/098976 dated Nov. 30, 2016 7 Pages (including translation).
The State Intellectual Property Office of the People's Republic of China (SIPO) Office Action 1 for 201510613392.3 dated Oct. 9, 2017 6 Pages (including translation).

\* cited by examiner

| Obtain current first picture data and second picture data in a process of a network call with a second terminal, the first picture data being first type of picture data, and the second picture data being second type of picture data | ~ 401 |
|---|---|

| Send the second picture data to a social application server on the premise that the first picture data has not been sent | ~ 402 |
|---|---|

NETWORK CALL METHOD AND APPARATUS, TERMINAL, AND SERVER

CROSS-REFERENCES TO RELATED APPLICATIONS

This application is a continuation application of PCT Patent Application No. PCT/CN2016/098976, filed on Sep. 14, 2016, which claims priority to Chinese Patent Application No. 201510613392.3, entitled "NETWORK CALL METHOD AND APPARATUS" filed on Sep. 23, 2015, the entire contents of both of which are incorporated herein by reference.

FIELD OF THE TECHNOLOGY

The present disclosure relates to the field of social applications, and in particular, to a network call method and apparatus, a terminal, and a server.

BACKGROUND OF THE DISCLOSURE

With the development of Internet technologies, functions of a social application are increasingly diversified, among which a network call function has become a function commonly used by users. By means of the network call function, a network call can be conducted between users in real time.

Using a network call among multiple persons as an example, a first user triggers a network call request in a social application group, and sends the network call request to a social application server. When receiving the network call request, the social application server sends the network call request to each of users in the social application group other than the first user. A user receiving the network call request may accept the network call request and join a network call, or may reject the network call request.

In the process of implementing the present disclosure, the inventor finds that at least the following problems exist in the foregoing technology:

A first user can only initiate a multi-person network call to each user in a social application group based on the social application group, resulting in great limitation. In addition, during a network call, any user in the social application group who does not join the network call can learn the proceeding of the network call, and can also join the network call at any time, resulting in poor privacy of the network call.

SUMMARY

To resolve the problems in the related technology, embodiments of the present disclosure provide a network call method and apparatus, a terminal, and a server. The technical solutions are as follows:

According to one aspect, a network call method is provided. The method can be applied to a first terminal including at least a memory and a processor, including: displaying a scenario interface for a social application group; displaying a first list of user identifiers when an instruction for initiating a specified call is received; determining, according to a selection operation in the first list of user identifiers, identifiers of second users; sending a network call request to a social application server, the network call request comprising an identifier of the first user logging in at the first terminal locally and the identifiers of the second users, so that the social application server creates a virtual group, and adds, to the virtual group, the first terminal and second terminals corresponding to the identifiers of the second users accepting call invitations; and performing a network call in a call interface for the virtual group.

According to another aspect, a first terminal is provided, including a display unit, a radio frequency circuit, a processor, and a memory, the memory storing program code, and the processor being configured to call the program code to perform the following operations: displaying a scenario interface for a social application group; displaying a first list of user identifiers when an instruction for initiating a specified call is received; determining, according to a selection operation in the first list of user identifiers, identifiers of second users; sending a network call request to a social application server, the network call request comprising an identifier of the first user logging in at the first terminal locally and the identifiers of the second users, so that the social application server creates a virtual group, and adds, to the virtual group, the first terminal and second terminals corresponding to the identifiers of the second users accepting call invitations; and performing a network call in a call interface for the virtual group.

BRIEF DESCRIPTION OF THE DRAWINGS

To describe the technical solutions of the embodiments of the present disclosure more clearly, the following briefly describes the accompanying drawings required for describing the embodiments. Apparently, the accompanying drawings in the following description show only some embodiments of the present disclosure, and a person of ordinary skill in the art may still derive other drawings from these accompanying drawings without creative efforts.

DESCRIPTION OF EMBODIMENTS

The following clearly and completely describes the technical solutions in the embodiments of the present disclosure with reference to the accompanying drawings in the embodiments of the present disclosure. Apparently, the described embodiments are some of the embodiments of the present disclosure rather than all of the embodiments. All other embodiments obtained by a person of ordinary skill in the art based on the embodiments of the present disclosure without creative efforts shall fall within the protection scope of the present disclosure.

For ease of understanding of the present disclosure, concepts involved in the embodiments of the present disclosure are first explained below.

A social application refers to an application having a social function, and may be an instant messaging application or an information presentation application or the like. A social application server refers to a server or a server cluster providing a service for the social application.

A social application group refers to a group created by the social application server. The social application group includes multiple terminals, and the multiple terminals may interact in a scenario interface for the social application group. Moreover, the social application server provides an entrance of the social application group for each of the multiple terminals, and each terminal can enter the scenario interface at any time by using the provided entrance.

A virtual group refers to a temporary group that is created by the social application server and that is used for a network call. The virtual group includes multiple terminals, and the terminals can perform a network call in a call interface for the virtual group. However, the social application server does not provide an entrance of the virtual group for the multiple terminals, and once a particular terminal exits the network call, the terminal can no longer enter the call interface for the virtual group, nor can join the network call again.

The virtual group is equivalent to a virtual room in the social application group. A user in the social application group can invite another user in the social application group to enter the virtual room, and can also invite a friend to enter the virtual room. When multiple users perform a network call in the virtual group, another user in the social application group cannot arbitrarily enter or exit the virtual group.

Figure 1:
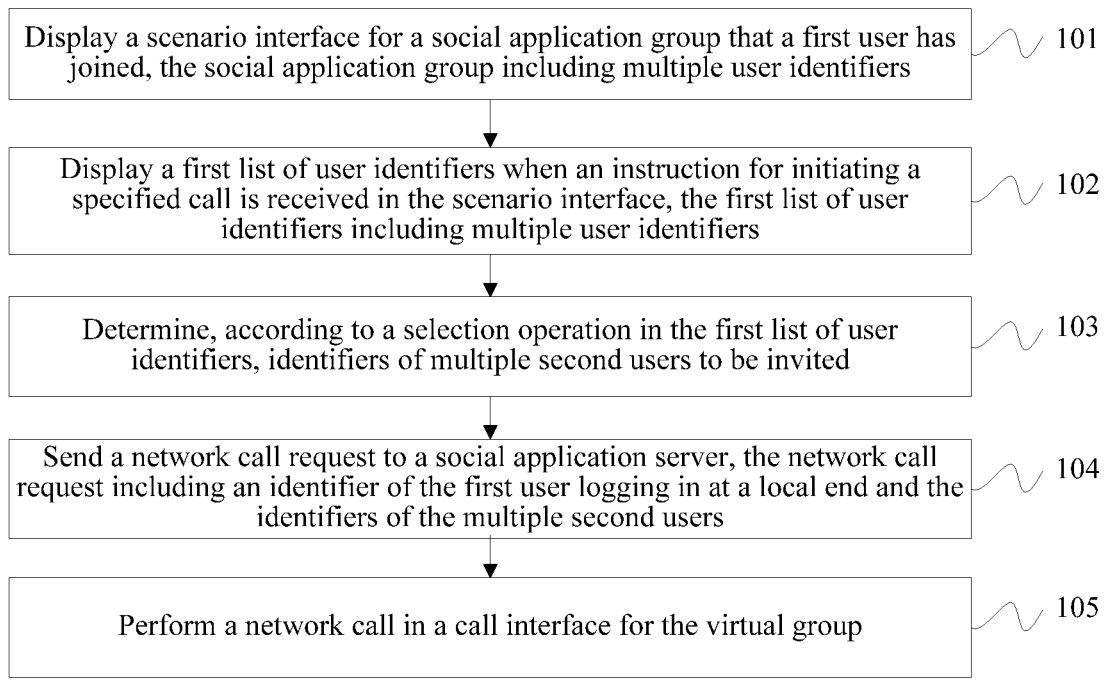
FIG. 1 is a flowchart of a network call method according to an embodiment of the present disclosure.

FIG. 1 is a flowchart of a network call method according to an embodiment of the present disclosure. This embodiment of the present disclosure is executed by a terminal. Referring to FIG. 1, the method can be applied to a first terminal including at least a memory and a processor, and the method includes the following.

101. Display a scenario interface for a social application group that a first user has joined, the social application group including multiple user identifiers.

102. Display a first list of user identifiers when an instruction for initiating a specified call is received in the scenario interface.

103. Determine, according to a selection operation in the first list of user identifiers, identifiers of second users to be invited.

104. Send a network call request to a social application server, the network call request including an identifier of the first user logging in at the first terminal locally and the identifiers of the second users, so that the social application server creates a virtual group, and adds, to the virtual group, the first terminal and second terminals corresponding to the identifiers of the second users accepting call invitations.

105. Perform a network call in a call interface for the virtual group.

By means of the method provided in this embodiment of the present disclosure, a list of user identifiers is displayed when an instruction for initiating a specified call is received in a scenario interface for a social application group, so that a user can select, from the list of user identifiers, identifiers of users with which the user is to perform a network call, and does not need to initiate a network call to each user in the social application group, thereby improving flexibility. Further, a social application server creates a virtual group, and multiple users perform a network call in a call interface for the virtual group, rather than performing a network call in the scenario interface for the social application group, and a user in the social application group that has not joined the network call cannot learn the preceding of the network call, nor can join the network call, thereby improving privacy of the network call.

Optionally, the displaying a first list of user identifiers includes:
  obtaining each user identifier in the social application group other than an identifier of the first user; and
  displaying each obtained user identifier.

Optionally, the displaying a first list of user identifiers includes:
  displaying a user relation chain of the identifier of the first user, where the user relation chain includes a plurality of user identifiers.

Optionally, the method further includes:
  determining, when a tap operation on a multi-person call option in the scenario interface is detected, that the instruction for initiating a specified call is received.

Optionally, the method further includes:
  receiving an add instruction in the call interface during the network call; in response to the add instruction, displaying a second list of user identifiers;
  determining, according to a selection operation in the second list of user identifiers, an identifier of at least one third user to be invited; and
  sending a user adding request to the social application server based on the virtual group, where the user adding request includes the identifier of the at least one third user, so that the social application server adds, to the virtual group, a third terminal corresponding to an identifier of a third user accepting a call invitation.

All the foregoing optional technical solutions may form optional embodiments of the present disclosure in any combination, which are not enumerated herein.

Figure 2:
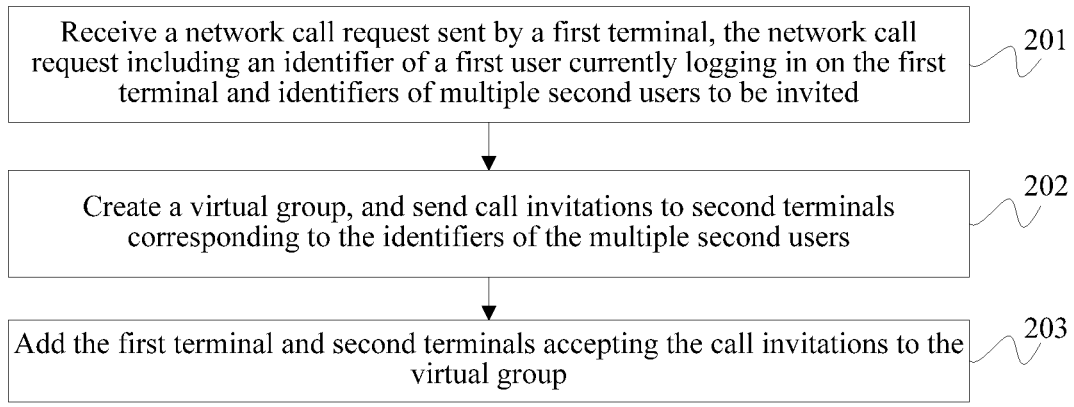
FIG. 2 is a flowchart of a network call method according to an embodiment of the present disclosure.

FIG. 2 is a flowchart of a network call method according to an embodiment of the present disclosure. This embodiment of the present disclosure is executed by a social application server. Referring to FIG. 2, the method includes:

201. Receive a network call request sent by a first terminal, the network call request including an identifier of a first user currently logging in on the first terminal and identifiers of multiple second users to be invited.

202. Create a virtual group, and send call invitations to second terminals corresponding to the identifiers of the multiple second users.

203. Add the first terminal and second terminals accepting the call invitations to the virtual group, so that the first terminal and the second terminals accepting the call invitations perform a network call in a call interface for the virtual group.

By means of the method provided in this embodiment of the present disclosure, a virtual group is created when a network call request is received, so that multiple users can perform a network call in the virtual group, and do not need to perform a call in a social application group that has been created, thereby improving flexibility. Further, a user in the social application group that has not joined the network call cannot learn the preceding of the network call, nor can join the network call, thereby improving privacy of the network call.

Optionally, the method further includes:
deleting, when an exiting request sent by any terminal in the virtual group is received, the terminal sending the exiting request from the virtual group.

Optionally, the method further includes:
deleting the virtual group when a quantity of remaining terminals in the virtual group is less than a preset threshold.

All the foregoing optional technical solutions may form optional embodiments of the present disclosure in any combination, which are not enumerated herein.

Figure 3A:
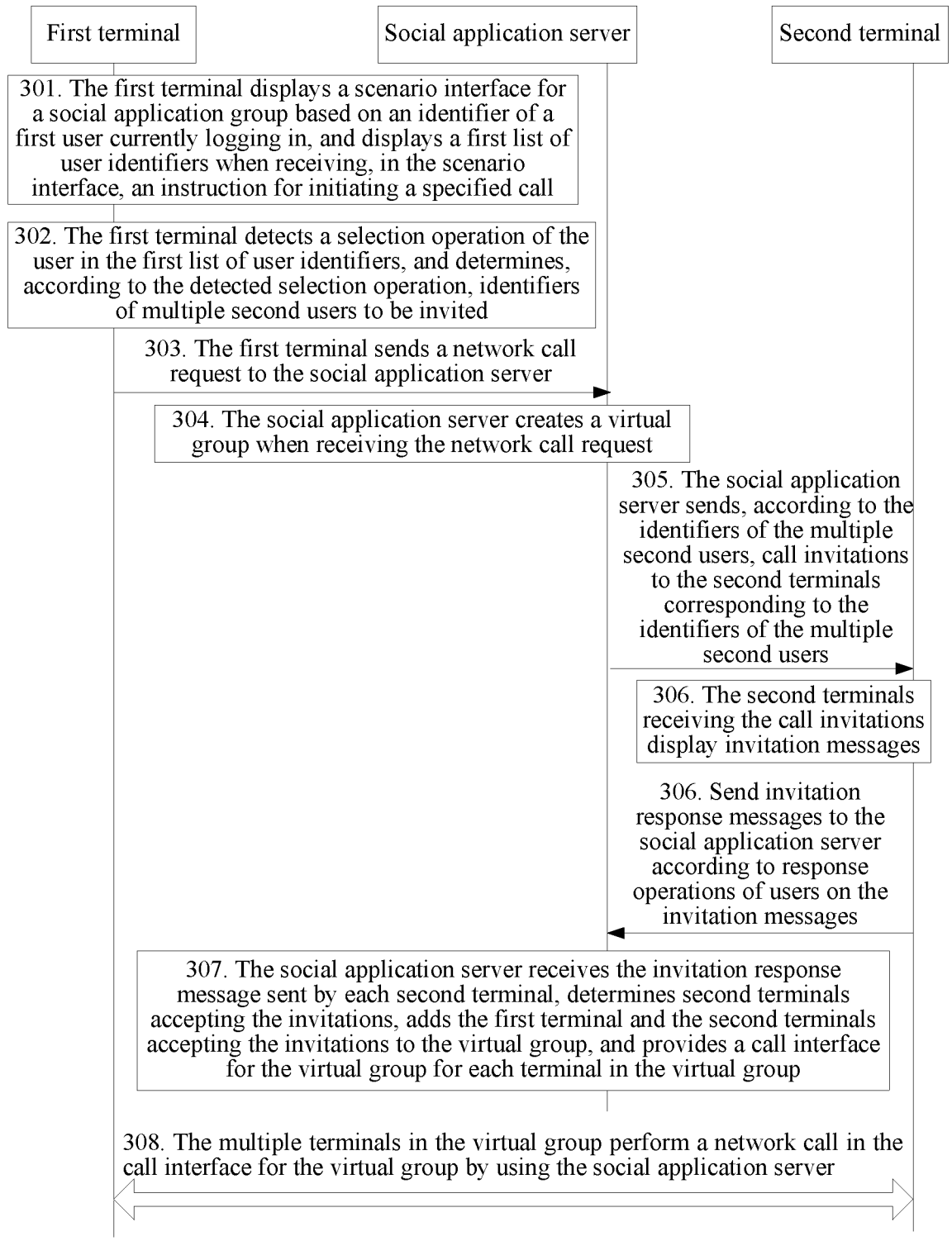
FIG. 3A is a flowchart of a network call method according to an embodiment of the present disclosure.

FIG. 3A is a flowchart of a network call method according to an embodiment of the present disclosure. Interactive bodies of this embodiment of the present disclosure are a first terminal, a social application server, and multiple second terminals. Referring to FIG. 3A, the method includes:

301. The first terminal displays a scenario interface for a social application group based on an identifier of a first user currently logging in, and displays a first list of user identifiers when receiving, in the scenario interface, an instruction for initiating a specified call.

The first terminal may be a mobile phone, a computer, a tablet computer, or the like. The first terminal logs in to a social application based on the identifier of the first user, and the first terminal has joined the social application group, and can display the scenario interface for the social application group. The social application group includes multiple user identifiers, and the multiple user identifiers are used to determine users in the social application group, and may be user accounts, telephone numbers, user nicknames, or the like. The scenario interface may include the list of user identifiers formed by the multiple user identifiers, and may further include a session window and detail information of the social application group. These are not limited in this embodiment of the present disclosure.

Any user in the social application group may post multimedia information in the social application group, for example, a text, a picture, a speech, or a video, and view multimedia information published in the social application group by another user.

Further, to make real-time communication among the users convenient, any user in the social application group may also initiate a network call in the social application group, and each user in the social application group can join the network call. The network call may be a video call or an audio call, and during the video call, any terminal can turn on a camera for the video call, or during the audio call, any terminal can turn off a camera for the audio call. This is not limited in this embodiment of the present disclosure.

However, in actual application, a user may intend to perform a network call with only some users in the social application group, and does not intend to perform a network call with each user in the social application group. In this case, the user can create another social application group, add the users with which the user intends to perform the network call to the newly created social application group, and then perform the network call based on the newly created social application group. However, the foregoing process of initiating a network call is excessively complicated.

In this embodiment of the present disclosure, the first user of the first terminal is used as an example. To simplify operations of the first user, when the first user does not intend to create another social application group to perform a network call, the first user may trigger, in the scenario interface for the social application group, an instruction for initiating a specified call. The instruction for initiating a specified call is used to instruct to initiate a network call to some users in the social application group, and not necessarily to initiate a network call to all the users in the social application group. In this case, when receiving the instruction for initiating a specified call, the first terminal displays the first list of user identifiers. The first list of user identifiers includes multiple user identifiers, and the first user selects, from the first list of user identifiers, identifiers of the users with which the first user intends to perform the network call.

The scenario interface may include a multi-person call option for triggering the instruction for initiating a specified call. When detecting a tap operation on the multi-person call option, the terminal determines that the instruction for initiating a specified call is received. In addition, the multi-person call option may be set to triggering to initiate an audio call by default, or set to triggering to initiate a video call by default. Alternatively, the scenario interface may include a multi-person call option for triggering to initiate an audio call and a multi-person call option for triggering to initiate a video call. Certainly, the instruction for initiating a specified call may also be triggered in another manner. This is not limited in this embodiment of the present disclosure.

In addition, the first list of user identifiers may include user identifiers in the social application group other than the identifier of the first user. That is, when receiving the instruction for initiating a specified call, the first terminal obtains each user identifier in the social application group other than the identifier of the first user, and displays each obtained user identifier, and the user may select one or more user identifiers therefrom for a network call.

Alternatively, the first list of user identifiers may also include user identifiers in a user relation chain of the identifier of the first user. The identifier of the first user has the user relation chain, the user relation chain includes multiple user identifiers, and the multiple user identifiers may be considered as friends of the identifier of the first user (not necessarily in the social application group). In this case, when receiving the instruction for initiating a specified call, the first terminal obtains the user relation chain of the identifier of the first user, and displays the user relation chain.

Alternatively, the first list of user identifiers not only may include the user identifiers in the social application group other than the identifier of the first user, but also may include the user identifiers in the user relation chain of the identifier of the first user. This is not described herein again in this embodiment of the present disclosure.

Figure 3B:
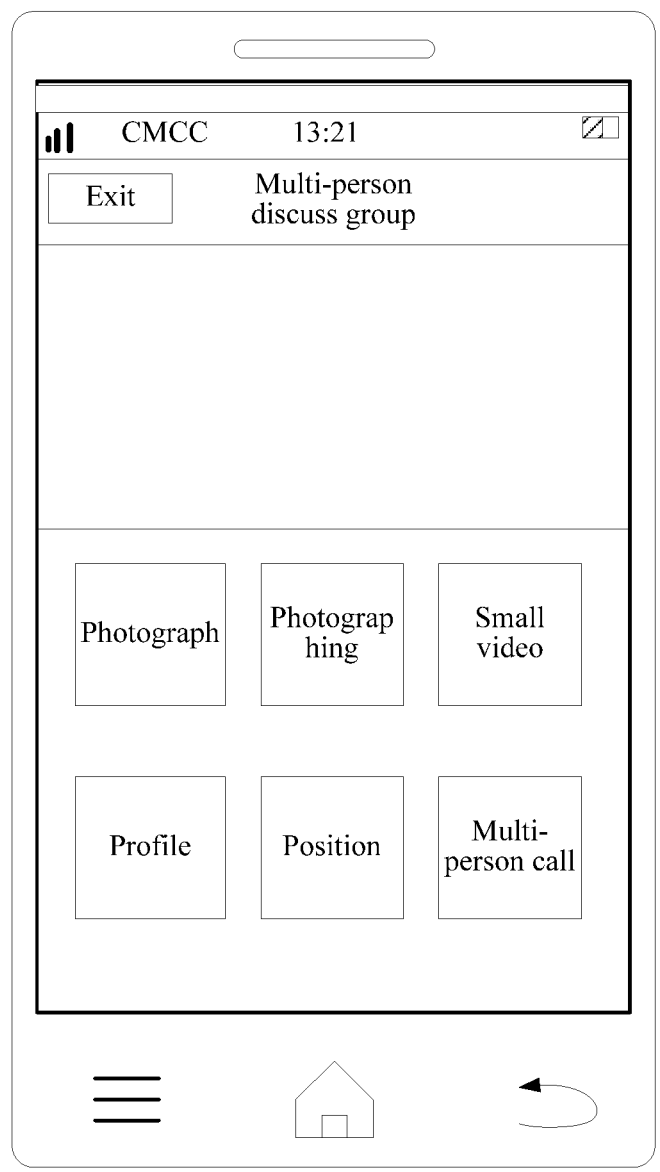
FIG. 3B is a schematic diagram of a scenario interface for a social application group according to an embodiment of the present disclosure.
Figure 3C:
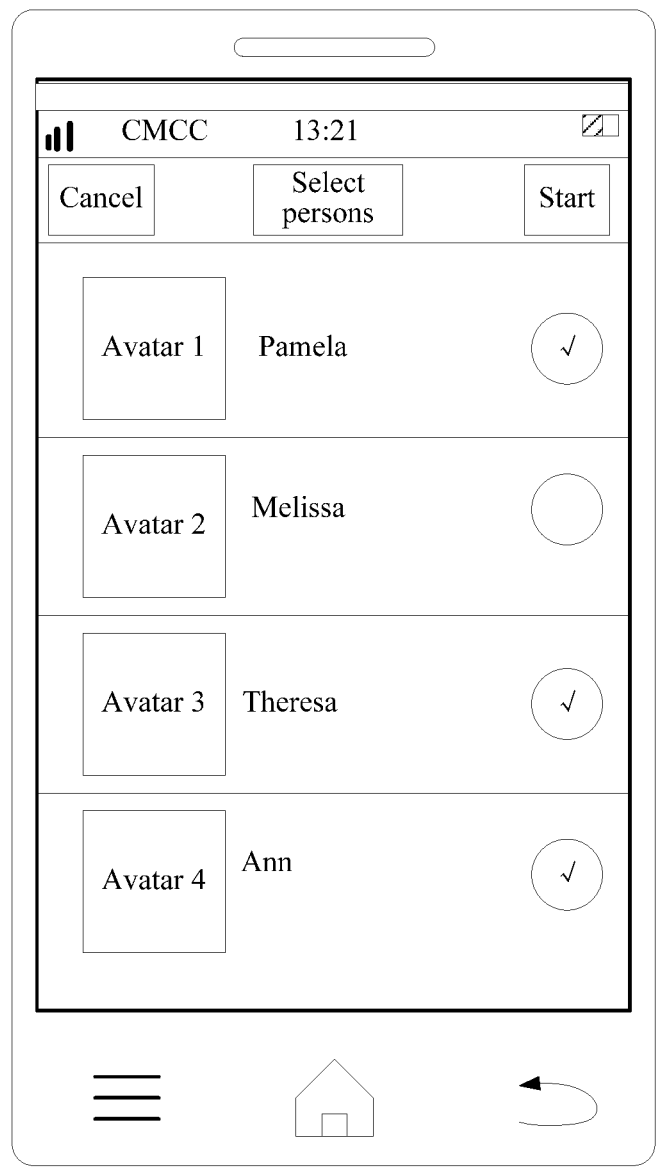
FIG. 3C is a schematic diagram of a first list of user identifiers according to an embodiment of the present disclosure.

Referring to FIG. 3B, the first terminal displays the scenario interface for the social application group. The scenario interface includes the multi-person call option, and when the first user taps on the multi-person call option, the first terminal displays the first list of user identifiers as shown in FIG. 3C.

302. The first terminal detects a selection operation of the user in the first list of user identifiers, and determines, according to the detected selection operation, identifiers of multiple second users to be invited.

The selection operation may be an operation of tapping on a user identifier or an operation of applying a long press on a user identifier. This is not limited in this embodiment of the present disclosure.

The user triggers the selection operation in the first list of user identifiers, to select identifiers of users with which the user intends to perform a network call. The first terminal detects the selection operation, and determines the identifiers of the multiple users corresponding to the selection operation, and the identifiers of the multiple users may be used as the identifiers of the multiple second users to be invited.

Referring to FIG. 3C, the first list of user identifiers includes a circular selection identifier corresponding to each user identifier, and the first user selects, by tapping on circular selection identifiers in the first list of user identifiers, the identifiers of the users with which the first user intends to perform a network call. After selection is completed, a network call may be initiated by tapping on a start option.

303. The first terminal sends a network call request to the social application server, where the network call request includes the identifier of the first user and the identifiers of the multiple second users.

304. The social application server creates a virtual group when receiving the network call request.

To invite the identifiers of the multiple second users for a network call, the first terminal sends the network call request to the social application server. The network call request includes the identifier of the first user and the identifiers of the multiple second users, and the network call request indicates that the identifier of the first user and the identifiers of the multiple second users are to perform a network call in the virtual group. The first terminal does not need to separately create another social application group or add all the users in the current social application group to a network call. In this case, the social application server creates the virtual group when receiving the network call request.

Optionally, the social application server may allocate a group identifier to the virtual group. The group identifier is used to uniquely determine the virtual group, and may be a group name, a group number, or the like. In actual application, the social application server may preset multiple group identifiers for virtual groups. Each time a virtual group is created, the social application server may select one group identifier from the multiple preset group identifiers and allocate the group identifier to the virtual group, and each time a virtual group is deleted, may recycle a group identifier allocated to the virtual group.

It should be noted that, a difference between the social application group and the virtual group lies in that, after a terminal joins the social application group, the social application server provides an entrance of the social application group for the terminal, and the terminal may enter the social application group at any time by using the entrance, and display the scenario interface for the social application group. For example, the entrance of the social application group may be displayed in a contact list of the terminal. However, after a terminal joins the virtual group, the social application server provides a call interface for the virtual group for the terminal, and the terminal may perform a network call with other terminals in the call interface, but once exiting the virtual group, the terminal can no longer obtain an entrance of the virtual group, nor can enter the virtual group again.

305. The social application server sends, according to the identifiers of the multiple second users, call invitations to the second terminals corresponding to the identifiers of the multiple second users.

306. The second terminals receiving the call invitations display invitation messages, and send invitation response messages to the social application server according to response operations of users on the invitation messages.

To invite the identifiers of the multiple second users for a network call, the social application server sends the call invitations to the second terminals corresponding to the identifiers of the multiple second users, and the second terminals receiving the call invitations display invitation messages. In this case, a user may respond to the invitation message, to accept, reject, or omit the call invitation. The second terminal detects the response operation of the user on the invitation message, and sends an invitation response message corresponding to the response operation to the social application server. The invitation response message may be a response message of accepting the invitation, a response message of rejecting the invitation, or a response message of omitting the invitation.

307. The social application server receives the invitation response message sent by each second terminal, determines second terminals accepting the invitations, adds the first terminal and the second terminals accepting the invitations to the virtual group, and provides a call interface for the virtual group for each terminal in the virtual group.

The social application server receives the invitation response message sent by each second terminal, determines second terminals sending response messages of accepting the invitations as the second terminals accepting the invitations, and the social application server adds the first terminal and the second terminals accepting the invitations to the virtual group.

Further, the social application server provides the call interface for the virtual group for each terminal in the virtual group, and the multiple terminals may display the call interface, and perform a network call in the call interface.

It should be noted that, the call interface for the virtual group is different from the scenario interface for the social application group. When the first terminal and the other terminals perform a network call in the call interface for the virtual group, the network call process does not have any effect on the scenario interface for the social application group, and a terminal in the social application group other than the terminals having joined the virtual group cannot learn the preceding of the network call, nor can join the network call. In addition, the terminals may also temporarily exit the call interface for the virtual group, open the scenario interface for the social application group again, and post information in the social application group.

It should be noted that, in this embodiment of the present disclosure, an example in which the virtual group is created first and then the call invitations are sent the identifiers of the multiple second users is only used for description. In actual application, the server may also first send the call invitations to the identifiers of the multiple second users, then create the virtual group, and add the identifier of the first user and the identifiers of the second users accepting the call invitations to the virtual group. A temporal relation between the virtual group creation process and the call invitation sending process is not limited in this embodiment of the present disclosure.

308. The multiple terminals in the virtual group perform a network call in the call interface for the virtual group by using the social application server.

When the multiple terminals perform the network call in the virtual group, any terminal may send information, for example, voice data and video data, to other terminals by using the social application server. A process in which the multiple terminals perform the network call in the call interface for the virtual group is similar to a process of performing a network call in the social application group, and details are not described herein again.

In addition, in the process of performing the network call in the virtual group, any terminal in the virtual group may exit the network call, that is, exit the virtual group. Specifically, when a terminal detects an operation of tapping an exiting option, an operation of closing the call interface, or an operation of closing the social application, the terminal sends an exiting request to the social application server. When receiving the exiting request, the social application server deletes the terminal sending the exiting request from the virtual group. Thereafter, the terminal cannot display the call interface for the virtual group, and cannot join the network call again.

The terminal triggering the exiting request may be the first terminal, or may be any second terminal. When any terminal in the virtual group exits the network call, other terminals in the virtual group may continue the network call.

Figures 3D, 4:
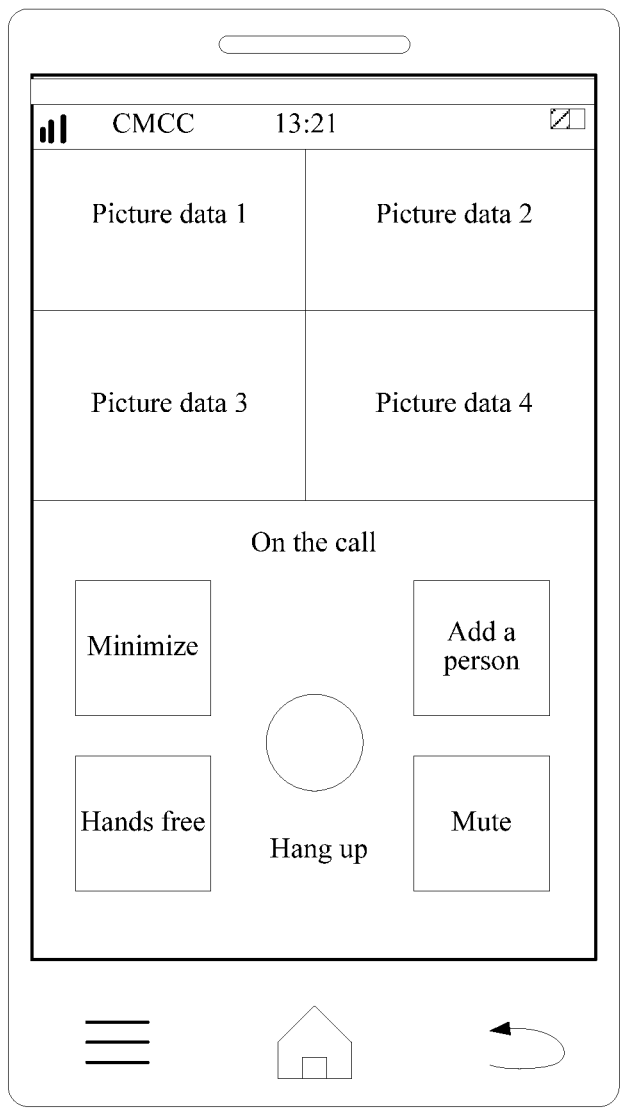
FIG. 3D is a schematic diagram of a call interface according to an embodiment of the present disclosure.
FIG. 4 is a flowchart of a network call method according to an embodiment of the present disclosure.

Referring to FIG. 3D, each terminal performing the network call displays the call interface. The call interface includes an upper picture display area, where the display area is used to display picture data of each terminal. In addition, the call interface includes a "Hang up" option for exiting the network call, and when a user taps on the "Hang up" option, the terminal may exit the network call, that is, exit the virtual group.

In addition, during the network call, any terminal in the virtual group may also invite another terminal to join the virtual group. Specifically, the call interface includes a user adding option. When any terminal in the virtual group detects a tap operation on the user adding option in the call interface, the terminal displays a second list of user identifiers, where the second list of user identifiers includes multiple user identifiers; determines, according to a selection operation in the second list of user identifiers, an identifier of at least one third user to be invited; and sends a user adding request to the social application server based on the virtual group, where the user adding request includes the identifier of the at least one third user and the group identifier allocated to the virtual group. When receiving the user adding request, the social application server adds, to the virtual group according to the group identifier, a third terminal corresponding to an identifier of a third user accepting a call invitation.

Referring to FIG. 3D, the call interface includes an "Add person" option. When a user taps on the "Add person" option, a terminal may display a second list of user identifiers similar to that in FIG. 3C, and the user may select an identifier of a user with which the user intends to perform a network call.

A specific process of adding the third terminal is similar to the process of adding the second terminals in the foregoing steps 305 to 307, and details are not described herein again.

The second list of user identifiers may include a user identifier in the social application group other than the user identifiers included in the virtual group, and may further include a user identifier in a user relation chain of the terminal triggering the user adding request other than the user identifiers included in the virtual group. The second list of user identifiers is not limited in this embodiment of the present disclosure.

In addition, referring to FIG. 3D, the call interface further includes a "Minimize" option, a "Hands free" option, and a "Mute" option.

When a user taps on the "Minimize" option, a terminal displays the scenario interface for the social application group, and displays a window for the call interface in a specified area of the current display interface. When the user taps on the window, the terminal displays the call interface again.

When the user taps on the "Hands free" option when a loudspeaker is turned on, the terminal turns off the loudspeaker, and in this case, the user cannot hear a sound in the network call. When the user taps on the "Hands free" option when the loudspeaker is turned off, the terminal turns on the loudspeaker again.

When the user taps on the "Mute" option when a microphone is turned on, the terminal turns off the microphone, and in this case, other users in the network call cannot hear a sound of the user. When the user taps on the "Mute" option when the microphone is turned off, the terminal enables muting again.

Further, when the network call is to be ended, the multiple terminals in the virtual group exit the virtual group, and a quantity of remaining terminals in the virtual group decreases. The social application server may monitor the quantity of remaining terminals in the virtual group. When it is determined that the quantity of remaining terminals is less than a threshold, it indicates that the network call process is close to an end. In this case, to save group resources, the social application server may delete the virtual group. The preset threshold is determined by the social application server, and may be 1, 2, or the like. This is not limited in this embodiment of the present disclosure. When deleting the virtual group, the social application server may send prompt information to a remaining terminal in the virtual group, to prompt the remaining terminal that the virtual group is to be deleted.

In the existing technology, in a process in which a terminal performs a network call, if the terminal receives a new notification message by using a social application, a user is not notified of the notification message. However, in this embodiment of the present disclosure, in the process of the network call, when the terminal receives a new notification message by using the social application, the user may be notified of the notification message in a prompt manner that has been preset for the social application. The prompt manner may be vibration, ringing, or the like. This is not limited in this embodiment of the present disclosure.

By means of the method provided in this embodiment of the present disclosure, a list of user identifiers is displayed when an instruction for initiating a specified call is received in a scenario interface for a social application group, so that a user can select, from the list of user identifiers, identifiers of users with which the user is to perform a network call, and does not need to initiate a network call to each user in the social application group, thereby improving flexibility. Further, a social application server creates a virtual group, and multiple users perform a network call in a call interface for the virtual group, rather than performing a network call in the scenario interface for the social application group, and a user in the social application group that has not joined the network call cannot learn the preceding of the network call, nor can join the network call, thereby improving privacy of the network call. Moreover, when the instruction for initiating a specified call is received in the scenario interface for the social application group, not only user identifiers in the social application group may be invited, but also user identifiers in a user relation chain of a terminal initiating the network call, thereby breaking limitation of the social application group, and therefore improving flexibility.

For ease of description of the following embodiments, concepts involved in the following embodiments are first explained below.

First type of picture data: picture data having a relatively large data volume.

Second type of picture data: picture data having a relatively small data volume.

For picture data including same content, a data volume of the first type of picture data is greater than a data volume of the second type of picture data. Specifically, a resolution of the first type of picture data is higher than a resolution of the second type of picture data, or a frame rate of the first type of picture data is higher than a frame rate of the second type of picture data.

Correspondingly, a display area occupied by the first type of picture data is larger than a display area occupied by the second type of picture data, and a display effect of the first type of picture data is better than a display effect of the second type of picture data. However, data traffic consumed for sending the first type of picture data is larger than data traffic consumed for sending the second type of picture data.

FIG. 4 is a flowchart of a network call method according to an embodiment of the present disclosure. This embodiment of the present disclosure is executed by a first terminal. Referring to FIG. 4, the method includes:

401. Obtain current first picture data and second picture data in a process of a network call with a second terminal, the first picture data being first type of picture data, the second picture data being second type of picture data, and a data volume of the first type of picture data being greater than a data volume of the second type of picture data.

402. Send the second picture data to a social application server on the premise that the first picture data has not been sent, so that the social application server sends the second picture data to the second terminal, and the second terminal displays the second picture data in a call interface.

In the existing technology, when the first terminal and the second terminal perform a network call, the first terminal obtains two types of picture data that are input, where a data volume of one type of data is larger, and a data volume of the other type of picture data is smaller, and uploads both the two types of picture data to the social application server. The social application server may provide the picture data having the smaller data volume, or provide the picture data having the larger data volume to the second terminal. However, regardless of which type of picture data is provided, the social application server provides only one type of picture data to the second terminal, but the first terminal uploads both the two types of picture data to the social application server. This results in a waste of unnecessary data traffic.

However, in this embodiment of the present disclosure, when the first terminal and the second terminal performs a network call, input first picture data and second picture data are obtained, where a data volume of the first picture data is larger, and a data volume of the second picture data is smaller. In this case, the first terminal does not upload both the first picture data and the second picture data to the social application server, but uploads only the second picture data having the smaller data volume to the social application server, and the social application server provides the second picture data to the second terminal. This avoids a waste of data traffic due to uploading of the first picture data.

By means of the method provided in this embodiment, in a process of a network call, first picture data having a larger data volume and second picture data having a smaller data volume are obtained, and the second picture data is sent to a social application server on the premise that the first picture data has not been sent, thereby reducing data traffic.

Optionally, after the sending the second picture data to a social application server on the premise that the first picture data has not been sent, the method further includes:

receiving a first display request sent by the social application server, where the first display request is triggered by the second terminal, and the first display request is used to request displaying the first type of picture data; and sending the current first picture data to the social application server, so that the social application server sends the first picture data to the second terminal, and the second terminal displays the first picture data in the call interface.

Optionally, the method further includes:

receiving fourth picture data of the second terminal, where the fourth picture data is forwarded by the social application server, and the fourth picture data is the second type of picture data;

displaying the fourth picture data in the call interface;

sending the first display request to the social application server when a preview switching operation on the fourth picture data is detected, so that the social application server sends the first display request to the second terminal, and the second terminal returns current third picture data, where the third picture data is the first type of picture data; and displaying the third picture data in the call interface.

Optionally, after the displaying the third picture data in the call interface, the method further includes:

sending a second display request to the social application server when a preview switching operation on the third picture data is detected, so that the social application server sends the second display request to the second terminal, and the second terminal returns the current fourth picture data, where the second display request is used to request displaying the second type of picture data; and displaying the fourth picture data in the call interface.

All the foregoing optional technical solutions may form optional embodiments of the present disclosure in any combination, which are not enumerated herein.

Figure 5A:
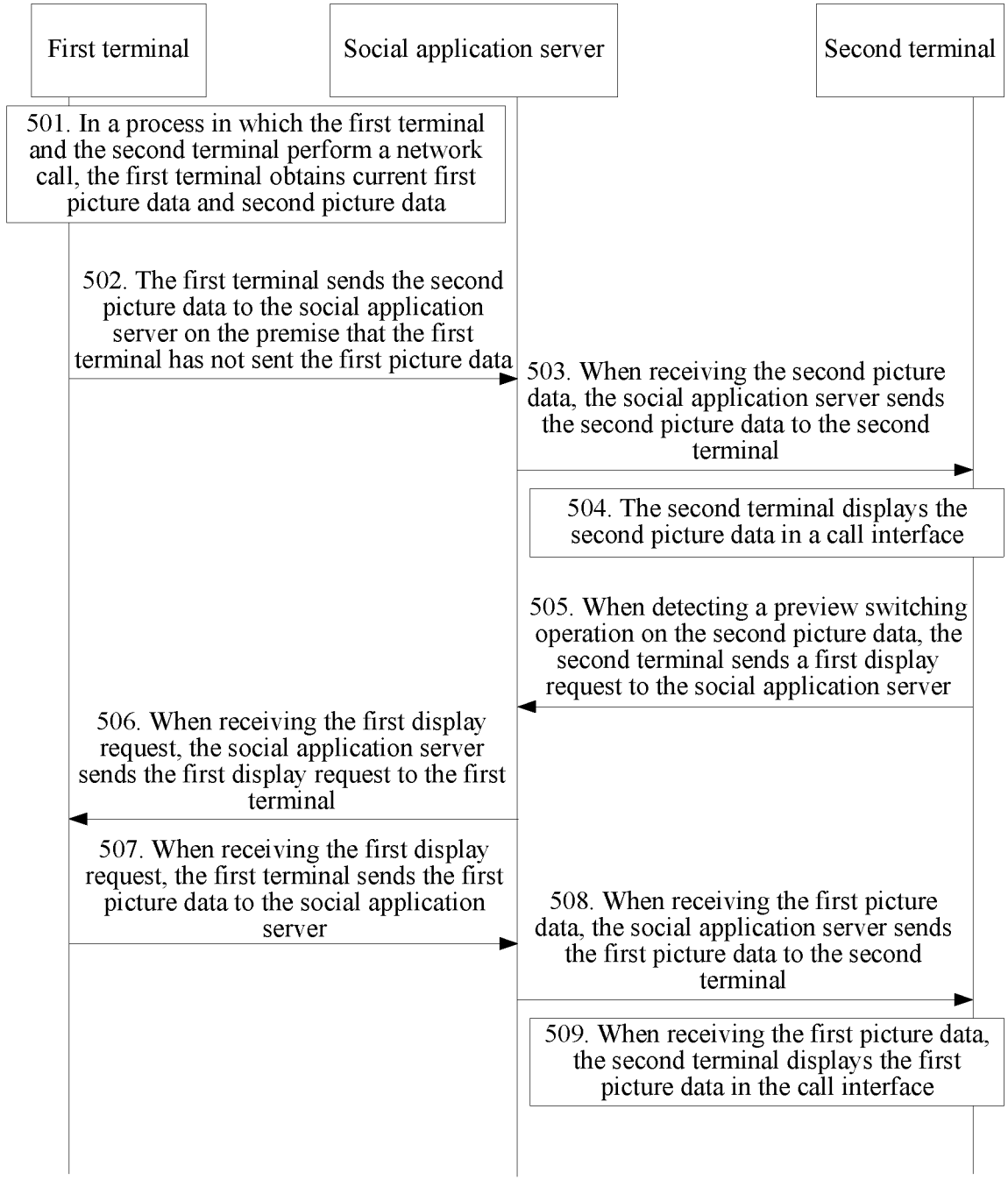
FIG. 5A is a flowchart of a network call method according to an embodiment of the present disclosure.

FIG. 5A is a flowchart of a network call method according to an embodiment of the present disclosure. Interactive bodies of this embodiment of the present disclosure are a first terminal, a social application server, and multiple second terminals. Referring to FIG. 5A, the method includes:

501. In a process in which the first terminal and the second terminal perform a network call, the first terminal obtains current first picture data and second picture data.

The network call in this embodiment of the present disclosure is a video call. In the process of the network call, the first terminal needs to send input picture data and audio data to the second terminal participating in the network call. The first terminal may perform a network call with one second terminal, or may perform a network call with multiple second terminals. This is not limited in this embodiment of the present disclosure.

In the process of the network call, the first terminal may perform capturing by using a camera, to obtain the input first picture data and the second picture data, where the first picture data is a first type of picture data, and the second picture data is a second type of picture data.

Content in the first type of picture data and content in the second type of picture data are the same, but a data volume of the first type of picture data is greater than a data volume of the second type of picture data. Specifically, a resolution of the first type of picture data is higher than a resolution of the second type of picture data, or a frame rate of the first type of picture data is higher than a frame rate of the second type of picture data.

Correspondingly, display effects of the first type of picture data and the second type of picture data are also different. During displaying, a display area occupied by the first type of picture data is larger than a display area occupied by the second type of picture data, and the display effect of the first type of picture data is better than the display effect of the second type of picture data. However, data traffic consumed for sending the first type of picture data is larger than data traffic consumed for sending the second type of picture data.

In addition, this embodiment of the present disclosure focuses on a processing process of only the picture data. For the audio data obtained by the first terminal, the first terminal may send the audio data to the social application server, the social application server sends the audio data to the second terminal, and the second terminal may play the audio data. Further, when multiple terminals perform a network call, after each terminal sends audio data to the social application server, the social application server may perform sound mixing processing on the multiple received pieces of audio data, and send obtained mixed audio data to each terminal, and each terminal may play the mixed audio data.

It should be noted that, for ease of differentiation, in this embodiment of the present disclosure, the first type of picture data obtained by the first terminal is referred to as the first picture data, the second type of picture data obtained by the first terminal is referred to as the second picture data, the first type of picture data obtained by the second terminal is referred to as third picture data, and the second type of picture data obtained by the second terminal is referred to as fourth picture data.

502. The first terminal sends the second picture data to the social application server on the premise that the first terminal has not sent the first picture data.

In the process of the network call, each terminal displays picture data of a peer end of the network call. In this embodiment of the present disclosure, each terminal first displays the second type of picture data by default. To reduce data traffic, the first terminal does not need to send the first picture data to the social application server, and only needs to send the second picture data to the social application server, and the social application server sends the second picture data to the second terminal.

503. When receiving the second picture data, the social application server sends the second picture data to the second terminal.

Further, if the first terminal performs a network call with multiple second terminals, the social application server sends the second picture data to each second terminal.

504. The second terminal displays the second picture data in a call interface.

In the process of the network call, the second terminal may display the call interface, and when receiving the second picture data, the second terminal displays the second picture data in the call interface.

Certainly, when displaying the second picture data, the second terminal further obtains the current fourth picture data of the second terminal, and displays the fourth picture data.

505. When detecting a preview switching operation on the second picture data, the second terminal sends a first display request to the social application server.

In the process in which the second terminal displays the second picture data, when a user of the second terminal intends to view a clearer picture from the first terminal, the user may trigger a preview switching operation on the second picture data. When detecting the preview switching operation, the second terminal sends the first display request to the social application server. The first display request is used to request displaying the first type of picture data, that is, request displaying the picture data having a larger data volume.

The preview switching operation may be a tap operation on the second picture data, or a tap operation on a "View a larger picture" option for the second picture data. This is not limited in this embodiment of the present disclosure.

506. When receiving the first display request, the social application server sends the first display request to the first terminal.

507. When receiving the first display request, the first terminal sends the first picture data to the social application server.

The second terminal sends the first display request to the first terminal by using the social application server. When receiving the first display request, the first terminal obtains the current first picture data, and sends the first picture data to the second terminal by using the social application server, and the second terminal may display the first picture data in the call interface.

It should be noted that, in actual application, a particular time may be consumed in the process from sending the second picture data to the second terminal by the first terminal to receiving the first display request by the first terminal. In this period of time, content of the picture data of the first terminal may change. In this case, when receiving the first display request, the first terminal may obtain the first type of picture data in the two types of picture data obtained at a current moment.

508. When receiving the first picture data, the social application server sends the first picture data to the second terminal.

509. When receiving the first picture data, the second terminal displays the first picture data in the call interface.

When the second terminal displays the first picture data, a display area occupied by the first picture data is excessively large. In this case, the second terminal may display the first picture data in a display area of the call interface, and no long display the fourth picture data obtained by the second terminal. Alternatively, the second terminal may also display the first picture data in the display area of the call interface, and display the fourth picture data at a layer above the first picture data, where the fourth picture covers a part of the first picture data. A display manner of the second terminal is not limited in this embodiment of the present disclosure.

In a subsequent process, when intending to view the second picture data again, the user of the second terminal may trigger a preview switching operation on the first picture data. When detecting the preview switching operation on the first picture data, the second terminal sends a second display request to the social application server, where the second display request is used to request displaying the second type of picture data. When receiving the second display request, the social application server sends the second display request to the first terminal. When receiving the second display request, the first terminal obtains the current second picture data, and sends the second picture data to the second terminal by using the social application server. Then, the second terminal may display the second picture data again in the call interface, and at the same time display the fourth picture data currently obtained by the second terminal.

Figure 5B:
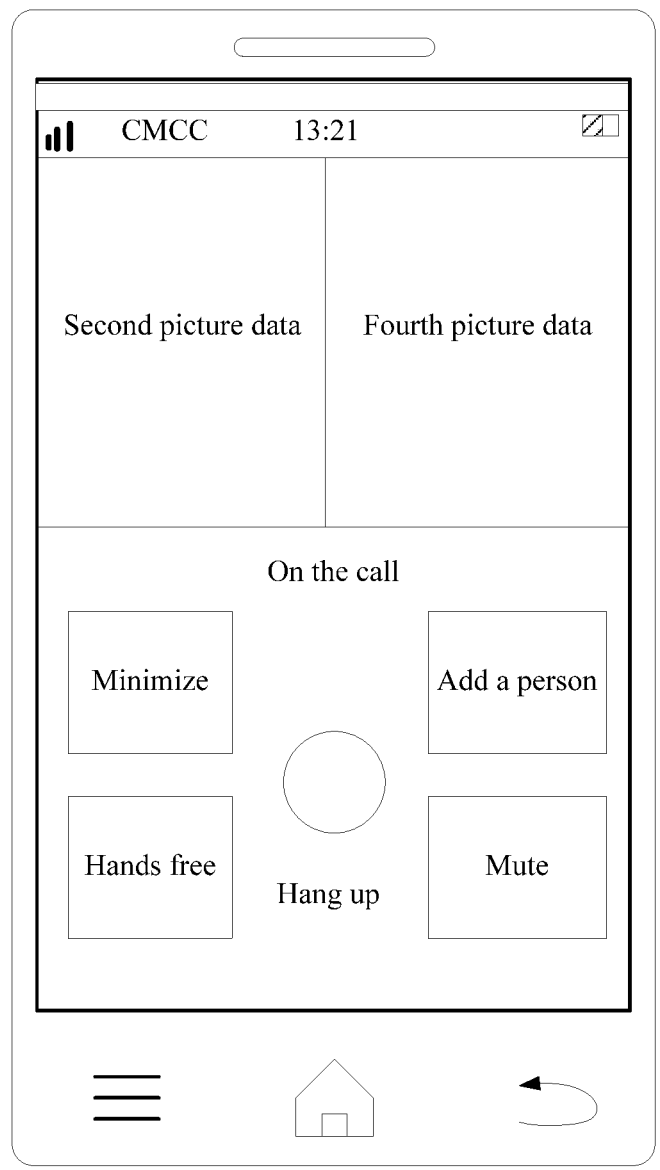
FIG. 5B is a schematic diagram of a call interface according to an embodiment of the present disclosure.
Figure 5C:
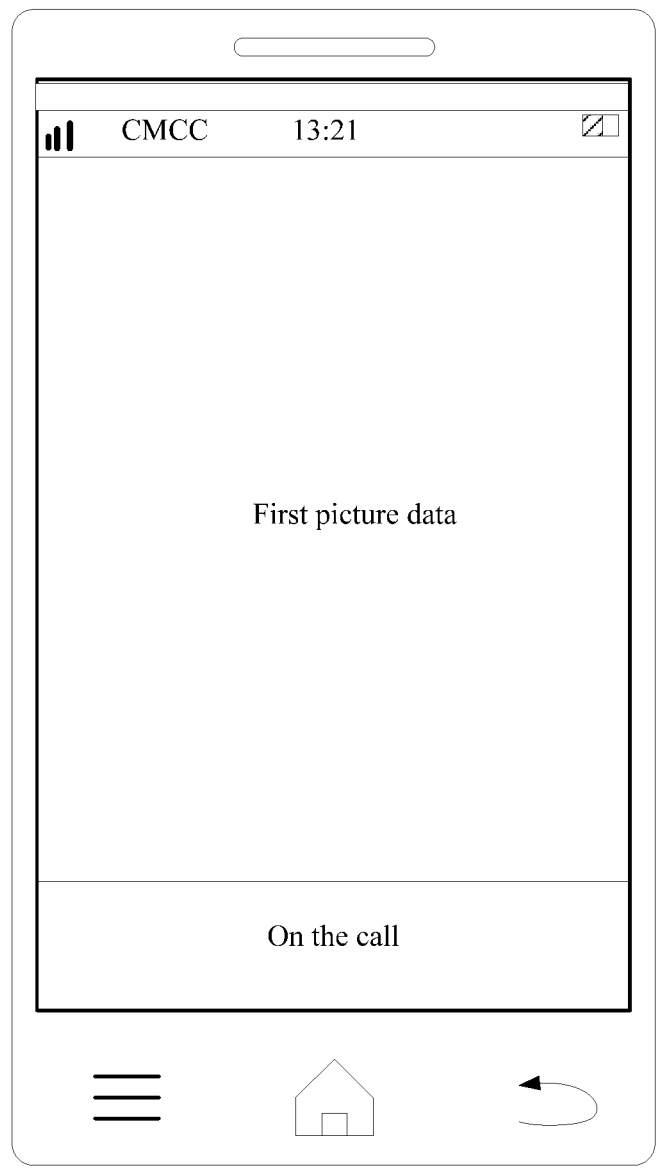
FIG. 5C is a schematic diagram of another call interface according to an embodiment of the present disclosure.

For example, the call interface displayed by the second terminal is shown in FIG. 5B. The call interface includes the second picture data of the first terminal and the fourth picture data of the second terminal. When the user of the second terminal taps on the display area of the second picture data, the second terminal sends the first display request to the first terminal by using the social application server. In this case, the first terminal returns the first picture data, and the second terminal may display the first picture data, as shown in FIG. 5C. When the user of the second terminal taps on the display area of the first picture data, the second terminal sends the second display request to the first terminal by using the social application server. In this case, the first terminal returns the second picture data, and the second terminal may display the second picture data and the fourth picture data again.

It should be noted that, in this embodiment of the present disclosure, only the picture data of the first terminal is used as an example for description. Actually, a processing process of the picture data of the second terminal is similar to the processing process of the picture data of the first terminal.

Specifically, the second terminal sends the fourth picture data to the social application server on the premise that that the second terminal has not sent the third picture data. When receiving the fourth picture data, the social application server sends the fourth picture data to the first terminal, and the first terminal displays the fourth picture data in the call interface. When detecting a preview switching operation on the fourth picture data, the first terminal sends the first display request to the social application server. When receiving the first display request, the social application server sends the first display request to the second terminal. The second terminal returns the current third picture data, and the first terminal may display the third picture data in the call interface. In a subsequent process, when detecting a preview switching operation on the third picture data, the first terminal sends the second display request to the social application server. When receiving the second display request, the social application server sends the second display request to the second terminal. The second terminal returns the current fourth picture data, and the first terminal may display the fourth picture data in the call interface again.

By means of the method provided in this embodiment of the present disclosure, in a process of a network call, first picture data having a larger data volume and second picture data having a smaller data volume are obtained. The second picture data is sent to a social application server on the premise that the first picture data has not been sent, and the first picture data is sent only when a first display request sent by the second terminal is received. In this way, data traffic is reduced, and a waste of unnecessary data traffic is avoided. In addition, the first picture data can be sent according to the first display request of a user, thereby satisfying a requirement of the user, and improving flexibility.

It should be noted that, the embodiment shown in FIG. 3A above and the embodiment shown in FIG. 5 above may be combined with each other. For example, by using the network call method provided in the embodiment shown in FIG. 3A above, the first terminal initiates a network call with multiple terminals. In the process of the network call, by using the network call method provided in the embodiment shown in FIG. 5 above, the multiple terminals may provide picture data having a smaller data volume to a peer end of the call by default, and provide picture data having a larger data volume to the peer end of the call only when the peer end of the call requests the picture data having a larger data volume, so as to reduce data traffic. A combination manner of the embodiment shown in FIG. 3A above and the embodiment shown in FIG. 5 above is not limited in this embodiment of the present disclosure.

Figure 6:
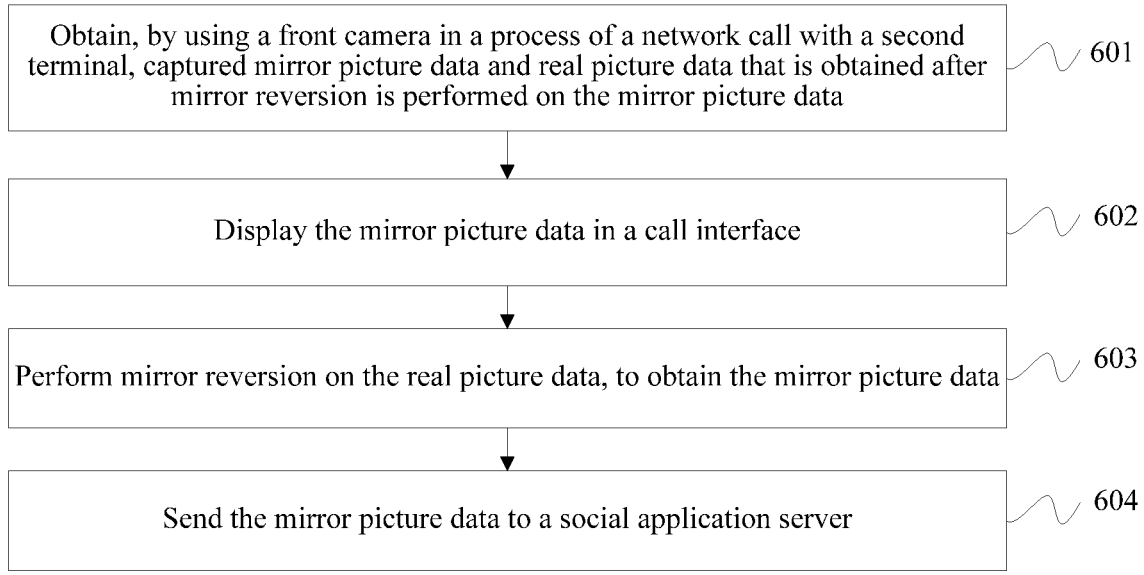
FIG. 6 is a flowchart of a network call method according to an embodiment of the present disclosure.

FIG. 6 is a flowchart of a network call method according to an embodiment of the present disclosure. This embodiment of the present disclosure is executed by a first terminal. Referring to FIG. 6, the method includes:

601. Obtain, by using a first front camera (e.g., of the first terminal) in a process of a network call with a second terminal, captured mirror picture data and real picture data that is obtained after mirror reversion is performed on the mirror picture data.

602. Display the mirror picture data in a call interface.

603. Perform mirror reversion on the real picture data, to obtain the mirror picture data.

604. Send the mirror picture data to a social application server, so that the social application server sends the mirror picture data to the second terminal, and the second terminal displays the mirror picture data in the call interface.

In the existing technology, in a process in which a first terminal and a second terminal perform a network call, if the first terminal captures a user by using a front camera, the front camera faces the user, and captures mirror picture data of the user. In this case, the front camera obtains real picture data after performing mirror reversion on the mirror picture data. The first terminal displays the mirror picture data, and usually sends the real picture data to the second terminal, and the second terminal displays the real picture data. Because left and right directions of the real picture data and the left and right directions of the mirror picture data are opposite, the picture data displayed by the first terminal and the picture data displayed by the second terminal are different. When a first user of the first terminal and a second user of the second terminal communicate based on the displayed picture data, the communication is inconvenient.

In this embodiment of the present disclosure, to resolve the problem of inconvenient communication, after the mirror picture data and the real picture data are obtained by using the front camera, mirror reversion is first performed on the real picture data before the picture data is sent to the second terminal, to obtain the mirror picture data, and then the mirror picture data is sent to the second terminal, so that the picture data displayed by the first terminal and the picture data displayed by the second terminal are consistent.

By means of the method provided in this embodiment of the present disclosure, in a process of a network call with a second terminal, if mirror picture data is captured by using a front camera, the front camera performs mirror reversion on the mirror picture data, to obtain real picture data. When obtaining the real picture data, a first terminal first performs mirror reversion on the real picture data, to obtain the mirror picture data, and then sends the mirror picture data to the second terminal by using a social application server, so that the second terminal displays the mirror picture data. In this way, it is ensured that the picture data displayed by the second terminal is the same as the picture data displayed by the first terminal, thereby making it convenient for users to communicate based on the same picture data.

Optionally, the method further includes:
receiving real picture data that is obtained by the second terminal by using a second front camera of the second terminal;
performing mirror reversion on the real picture data, to obtain mirror picture data; and
displaying, in the call interface, the mirror picture data obtained by reversion.

Optionally, the method further includes:
determining a display area, in the call interface, of each terminal performing the network call; and
displaying the mirror picture data of each terminal in the call interface according to the determined display area.

All the foregoing optional technical solutions may form optional embodiments of the present disclosure in any combination, which are not enumerated herein.

Figure 7:
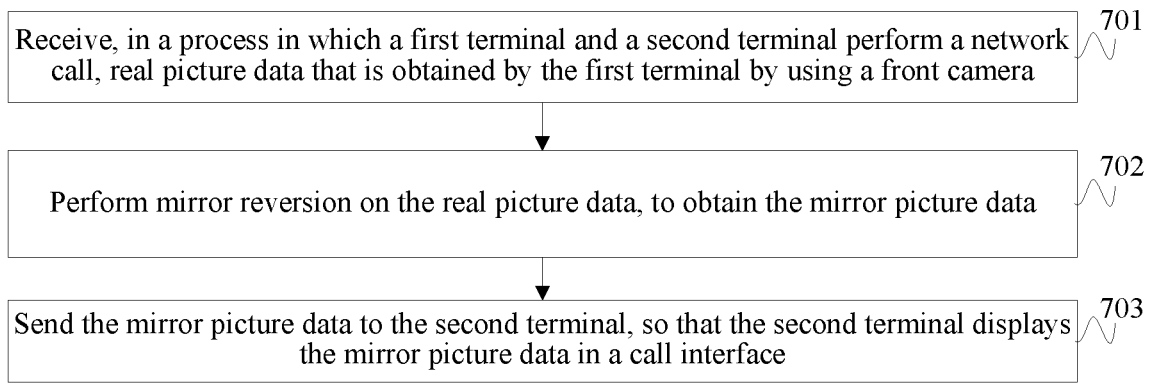
FIG. 7 is a flowchart of a network call method according to an embodiment of the present disclosure.

FIG. 7 is a flowchart of a network call method according to an embodiment of the present disclosure. This embodiment of the present disclosure is executed by a first terminal. Referring to FIG. 7, the method includes:

701. Receive, in a process in which the first terminal and a second terminal perform a network call, real picture data that is obtained by the first terminal by using a front camera, the real picture data being obtained by the front camera after performing mirror reversion on captured mirror picture data.

702. Perform mirror reversion on the real picture data, to obtain the mirror picture data.

703. Send the mirror picture data to the second terminal, so that the second terminal displays the mirror picture data in a call interface.

By means of the method provided in this embodiment of the present disclosure, in a process in which a first terminal and a second terminal perform a network call, if the first terminal captures mirror picture data by using a front camera, the front camera performs mirror reversion on the mirror picture data, to obtain real picture data. When obtaining the real picture data by using the front camera, the first terminal first performs mirror reversion on the real picture data, to obtain the mirror picture data, and then sends the mirror picture data to the second terminal, so that the second terminal displays the mirror picture data. In this way, it is ensured that the picture data displayed by the second terminal is the same as the picture data displayed by the first terminal, thereby making it convenient for users to communicate based on the same picture data.

Optionally, the method further includes:
determining, according to a quantity of the terminals performing the network call and a preset rule, a display area, in the call interface, of each terminal performing the network call; and
sending the determined display area to each terminal, so that each terminal displays the mirror picture data of each terminal in the call interface according to the determined display area.

All the foregoing optional technical solutions may form optional embodiments of the present disclosure in any combination, which are not enumerated herein.

Figure 8A:
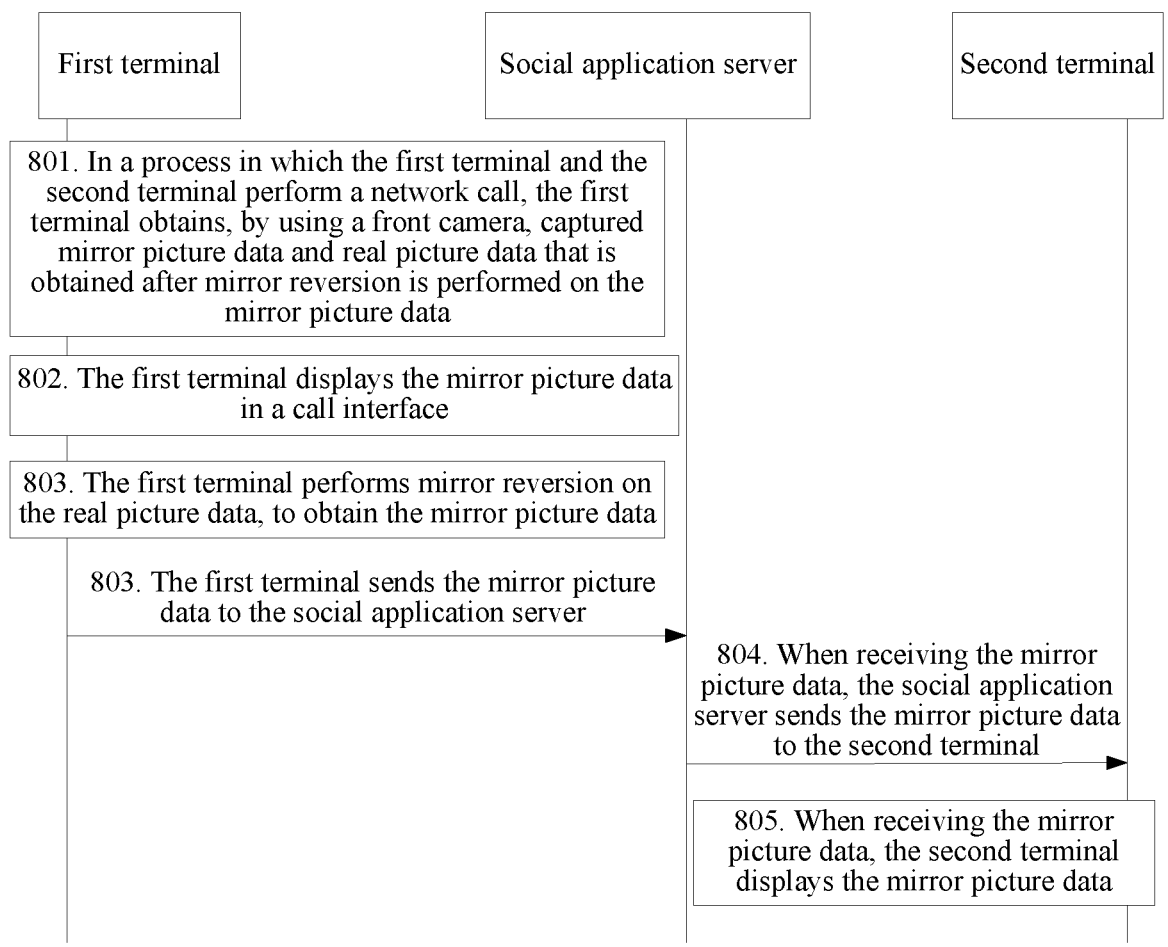
FIG. 8A is a flowchart of a network call method according to an embodiment of the present disclosure.

FIG. 8A is a flowchart of a network call method according to an embodiment of the present disclosure. Interactive bodies of this embodiment of the present disclosure are a first terminal, a social application server, and a second terminal (e.g., one of the second terminals corresponding to the second users accepting the call invitation). As shown in FIG. 8A, the method includes:

801. In a process in which the first terminal and the second terminal perform a network call, the first terminal obtains, by using a front camera, captured mirror picture data and real picture data that is obtained after mirror reversion is performed on the mirror picture data.

802. The first terminal displays the mirror picture data in a call interface.

Based on the principle that left and right directions are reversed after imaging of a plane mirror, when a front camera of a terminal captures a photograph for a user, left and right directions of the captured picture are the same as actual left and right directions of the user. After the capture, the camera automatically perform mirror reversion on the captured picture, so that left and right directions of an obtained real photograph are opposite to the actual left and right directions of the user.

Therefore, in the process in which the first terminal and the second terminal perform the network call, if the first terminal performs capturing by using the front camera, the first terminal obtains the mirror picture data, and the first terminal displays the mirror picture data in the call interface. At the same time, the front camera automatically performs mirror reversion on the mirror picture data, to obtain the real picture data, so that the first terminal sends the real picture data to the second terminal.

The mirror picture data is picture data that is directly captured by the front camera. Left and right directions of the mirror picture data are the same as actual left and right directions of a captured first user, and left and right directions of the real picture data are opposite to the actual left and right directions of the first user. That is, the mirror picture data and the real picture data are mirror images of each other, and upper and lower directions thereof are the same, and the left and right directions thereof are opposite.

If the first terminal directly sends the real picture data to the second terminal, the second terminal displays the real picture data. Because the left and right directions of the real picture data and the left and right directions of the mirror picture data are opposite, the picture data displayed by the first terminal is different from the picture data displayed by the second terminal, and when the first user of the first terminal and a second user of the second terminal communicate based on the displayed picture data, the communication is inconvenient.

For example, when a position of the first user in the mirror picture data is on the left, a position of the first user in the real picture data is on the right. In this case, if the second user tells the first user to move to the left, the first user continues to move to the left, and consequently the first user moves out of the mirror picture data from the left side, and also correspondingly moves out of the real picture data from the right side, and therefore the second user cannot see the first user.

803. The first terminal performs mirror reversion on the real picture data, to obtain the mirror picture data, and sends the mirror picture data to the social application server.

804. When receiving the mirror picture data, the social application server sends the mirror picture data to the second terminal.

805. When receiving the mirror picture data, the second terminal displays the mirror picture data.

To facilitate communication between the users, when obtaining the real picture data by using the front camera, the first terminal may not send the real picture data to the social application server, but first perform mirror reversion on the real picture data. In this case, the first terminal can obtain the mirror picture data, and then send the mirror picture data to the social application server, and the social application server sends the mirror picture data to the second terminal, so that the second terminal can display picture data same as that of the first terminal, and therefore there is no problem of inconvenient communication when the two users communicate based on the displayed picture data.

It should be noted that, in this embodiment of the present disclosure, an example in which mirror reversion is performed by the first terminal on the obtained real picture data is only used for description. In actual application, mirror reversion may also be performed by the social application server or mirror reversion may be performed by the terminal receiving the real picture data.

That is, in another embodiment provided by this embodiment of the present disclosure, steps 803 to 805 may also be replaced with the following step 1 or 2:

1. The first terminal sends the real picture data to the social application server. When receiving the real picture data, the social application server performs mirror reversion on the real picture data, to obtain the mirror picture data, and sends the mirror picture data to the second terminal. When receiving the mirror picture data, the second terminal displays the mirror picture data.

2. The first terminal sends the real picture data to the social application server. When receiving the real picture data, the social application server sends the real picture data to the second terminal. When receiving the real picture data, the second terminal performs mirror reversion on the real picture data, to obtain the mirror picture data, and displays the mirror picture data.

Similarly, for real picture data obtained by the second terminal by using a front camera, mirror reversion may be performed by one of the second terminal, the social application server, or the first terminal. For example, the first terminal receives the real picture data that is obtained by the second terminal by using the front camera, performs mirror reversion on the real picture data, to obtain mirror picture data, and displays, in the call interface, the mirror picture data obtained by reversion.

In this embodiment of the present disclosure, mirror reversion is performed on real picture data obtained by using a front camera, thereby ensuring that picture data displayed by terminals is the same, and facilitating communication between users.

It should be noted that, in this embodiment of the present disclosure, the first terminal may perform a network call with one second terminal, or may perform a network call with multiple second terminals. That is, a quantity of terminals in a network call may be two or more.

Further, to facilitate communication among users, the social application server may further determine a display area of each of the multiple terminals in the call interface according to the quantity of terminals performing the network call and a preset rule, and send the determined display area to each terminal, so that each terminal displays mirror picture data of each terminal in the call interface according to the determined display area.

When the quantity of terminals is less than 4 or equal to 4, the preset rule may be a four-block box rule. The social application server divides a display area into a four-block box, and determines a position of each terminal in the four-block box. In this case, each terminal can display mirror picture data of each terminal according to the determined position.

Alternatively, when the quantity of terminals is less than 9 or equal to 9, the preset rule may be a nine-block box rule. The social application server divides the display area into a nine-block box, and determines a position of each terminal in the nine-block box. In this case, each terminal can display mirror picture data of each terminal according to the determined position.

Figure 8B:
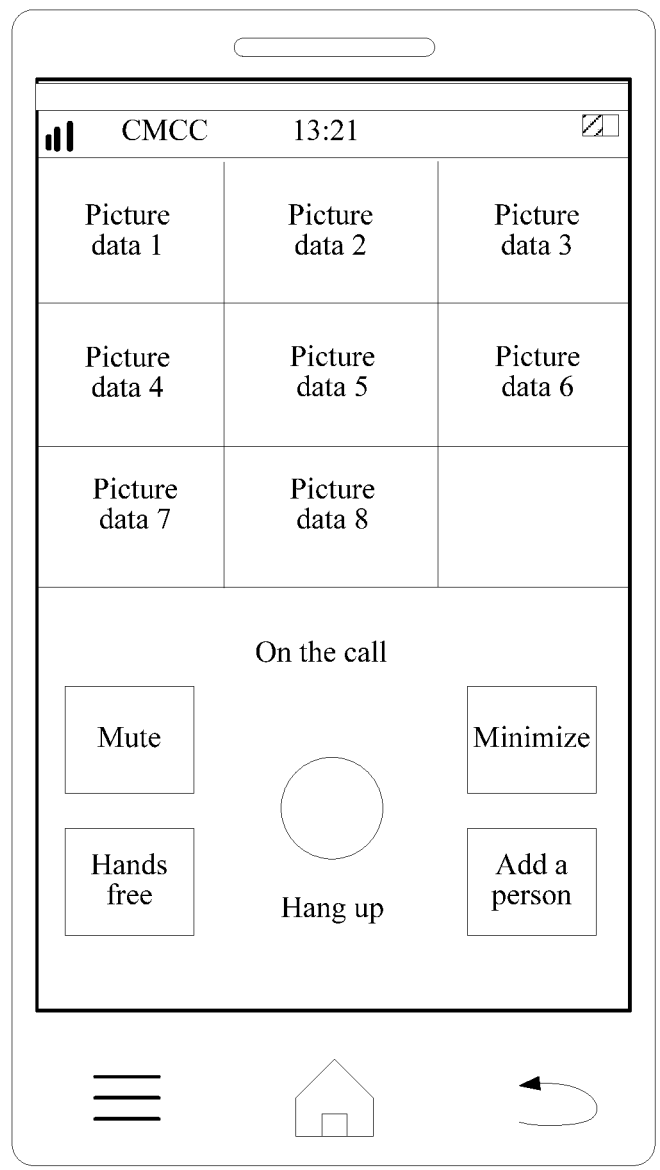
FIG. 8B is a schematic diagram of a nine-block box according to an embodiment of the present disclosure.

Referring to FIG. 8B, when the quantity of terminal performing the network call is eight, the social application server determines to display picture data by using a nine-block box, ranks eight terminals, determines an order of the eight terminals in the nine-block box, and sequentially displays mirror picture data of each terminal according to the order of the eight terminals. For each terminal performing the network call, when the terminal obtains mirror picture data of any terminal, the terminal displays the mirror picture data at a position corresponding to that terminal. Moreover, mirror picture data displayed by the terminals performing the network call and positions at which the mirror picture data is located are all the same.

By determining a display area of mirror picture data of each terminal, it is ensured that content of picture data displayed by terminals performing a network call and positions of the displayed picture data are all the same, thereby facilitating communication among users.

By means of the method provided in this embodiment of the present disclosure, in a process of a network call with a second terminal, if mirror picture data is captured by using a front camera, the front camera performs mirror reversion on the mirror picture data, to obtain real picture data. When the real picture data is obtained by using the front camera, mirror reversion is first performed on the real picture data, to obtain the mirror picture data, so that the second terminal displays the mirror picture data. In addition, a display area of mirror picture data of each terminal is determined, thereby ensuring that content of picture data displayed by terminals performing a network call and positions of the displayed picture data are all the same, and making it convenient for users to communicate based on the displayed picture data.

It should be noted that, the embodiment shown in FIG. 8A above and the embodiments shown in FIG. 3A and FIG. 5 above may be combined with each other. For example, a first terminal initiates a network call with multiple terminals by using the network call method provided in the embodiment shown in FIG. 3A above. In the process of the network call, the multiple terminals may use the network call method provided in the embodiment shown in FIG. 5 above and the network call method provided in the embodiment shown in FIG. 8A above. In this way, in addition to reducing data traffic, it is ensured that picture data displayed by the terminals are consistent, thereby facilitating communication among users.

A combination manner of the embodiment shown in FIG. 3A above, the embodiment shown in FIG. 5 above, and the embodiment shown in FIG. 8A above is not limited in this embodiment of the present disclosure. In the embodiment shown in FIG. 9A below, a specific process of combining the embodiments shown in FIG. 3A, FIG. 5, and FIG. 8A above is described by using an example.

Figure 9A:
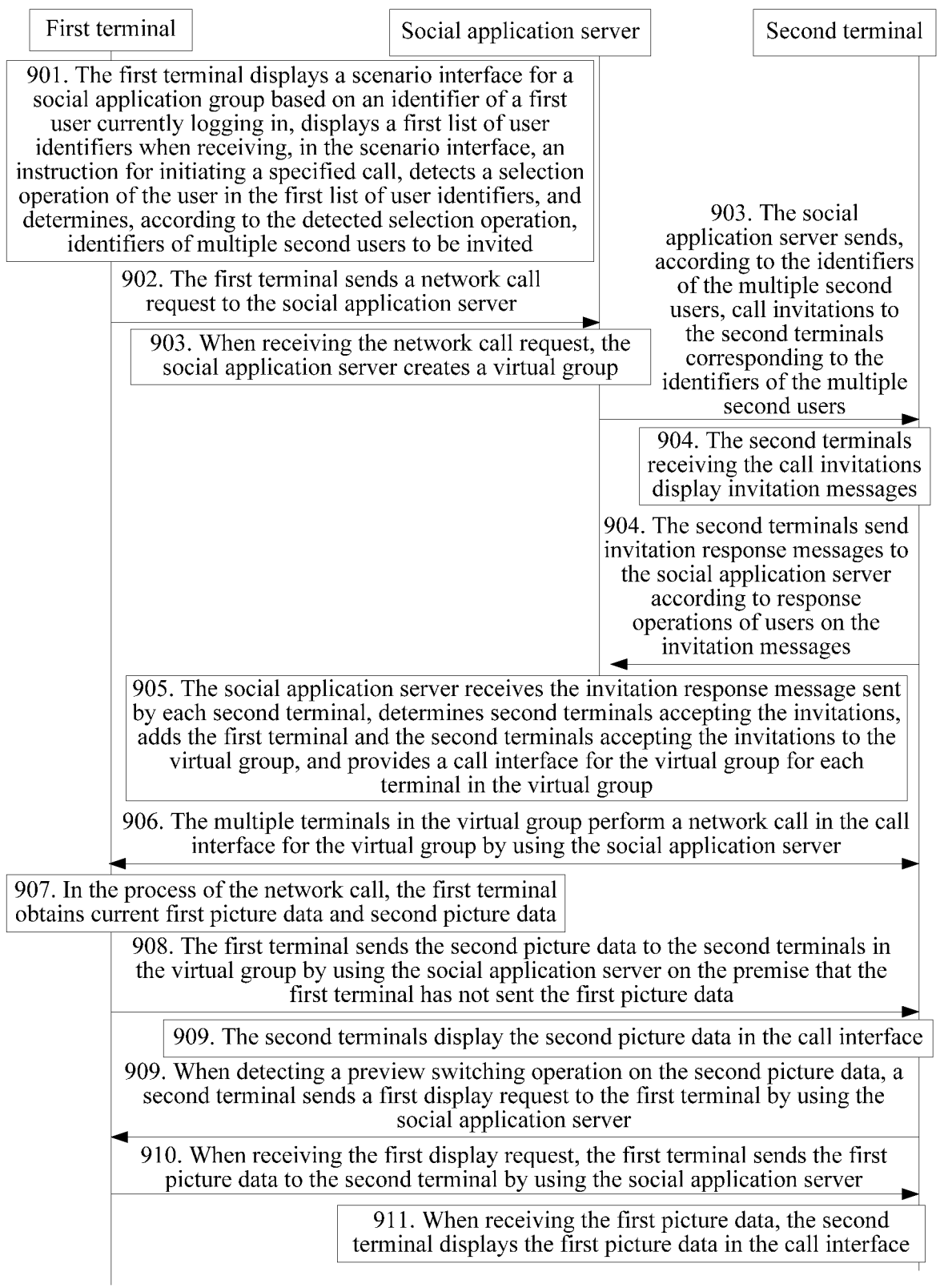
FIG. 9A is a flowchart of a network call method according to an embodiment of the present disclosure.

FIG. 9A is a flowchart of a network call method according to an embodiment of the present disclosure. Interactive bodies of this embodiment of the present disclosure are a first terminal, a social application server, and multiple second terminals. As shown in FIG. 9A, the method includes:

901. The first terminal displays a scenario interface for a social application group based on an identifier of a first user currently logging in, displays a first list of user identifiers when receiving, in the scenario interface, an instruction for initiating a specified call, detects a selection operation of the user in the first list of user identifiers, and determines, according to the detected selection operation, identifiers of multiple second users to be invited.

902. The first terminal sends a network call request to the social application server, where the network call request includes the identifier of the first user and the identifiers of the multiple second users.

903. When receiving the network call request, the social application server creates a virtual group, and sends, according to the identifiers of the multiple second users, call invitations to the second terminals corresponding to the identifiers of the multiple second users.

904. The second terminals receiving the call invitations display invitation messages, and send invitation response messages to the social application server according to response operations of users on the invitation messages.

905. The social application server receives the invitation response message sent by each second terminal, determines second terminals accepting the invitations, adds the first terminal and the second terminals accepting the invitations to the virtual group, and provides a call interface for the virtual group for each terminal in the virtual group.

906. The multiple terminals in the virtual group perform a network call in the call interface for the virtual group by using the social application server.

The foregoing steps 901 to 906 are similar to the foregoing steps 301 to 308, and details are not described herein again.

907. In the process in which the first terminal and the second terminals perform the network call, the first terminal obtains current first picture data and second picture data.

The first picture data is first type of picture data, the second picture data is second type of picture data, and a data volume of the first type of picture data is greater than a data volume of the second type of picture data.

908. The first terminal sends the second picture data to the second terminals in the virtual group by using the social application server on the premise that the first terminal has not sent the first picture data.

909. The second terminals display the second picture data in the call interface, and when detecting a preview switching operation on the second picture data, a second terminal sends a first display request to the first terminal by using the social application server.

910. When receiving the first display request, the first terminal sends the first picture data to the second terminal by using the social application server.

911. When receiving the first picture data, the second terminal displays the first picture data in the call interface.

The foregoing steps 907 to 911 are similar to the foregoing steps 501 to 509, and details are not described herein again.

In the foregoing step 907 to 911, picture data is classified into the first type of picture data and the second type of picture data. The second type of picture data is sent to the second terminals by default in the process of the network call, thereby reducing data traffic consumed when the picture data is sent.

Figure 9B:
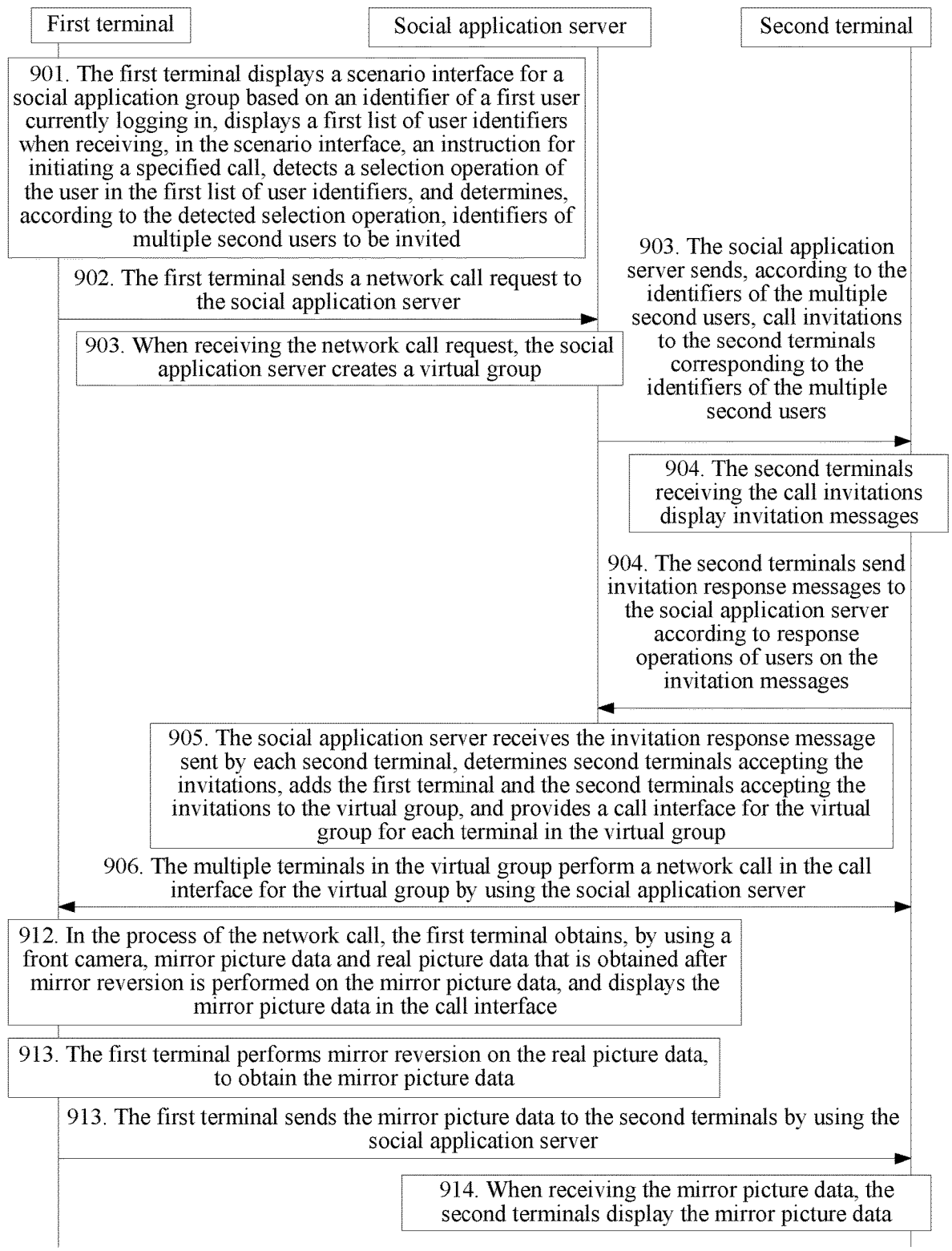
FIG. 9B is a flowchart of a network call method according to an embodiment of the present disclosure.

In another embodiment provided by this embodiment of the present disclosure, to ensure that picture data in the call interface of the terminals is the same during the network call, referring to FIG. 9B, after step 906, the method may further include the following steps 912 to 914:

912. In the process of the network call, the first terminal obtains, by using a front camera, mirror picture data and real picture data that is obtained after mirror reversion is performed on the mirror picture data, and displays the mirror picture data in the call interface.

913. The first terminal performs mirror reversion on the real picture data, to obtain the mirror picture data, and sends the mirror picture data to the second terminals by using the social application server.

914. When receiving the mirror picture data, the second terminals display the mirror picture data.

The foregoing steps 912 to 914 are similar to the foregoing steps 801 to 805, and details are not described herein again.

Figure 9C:
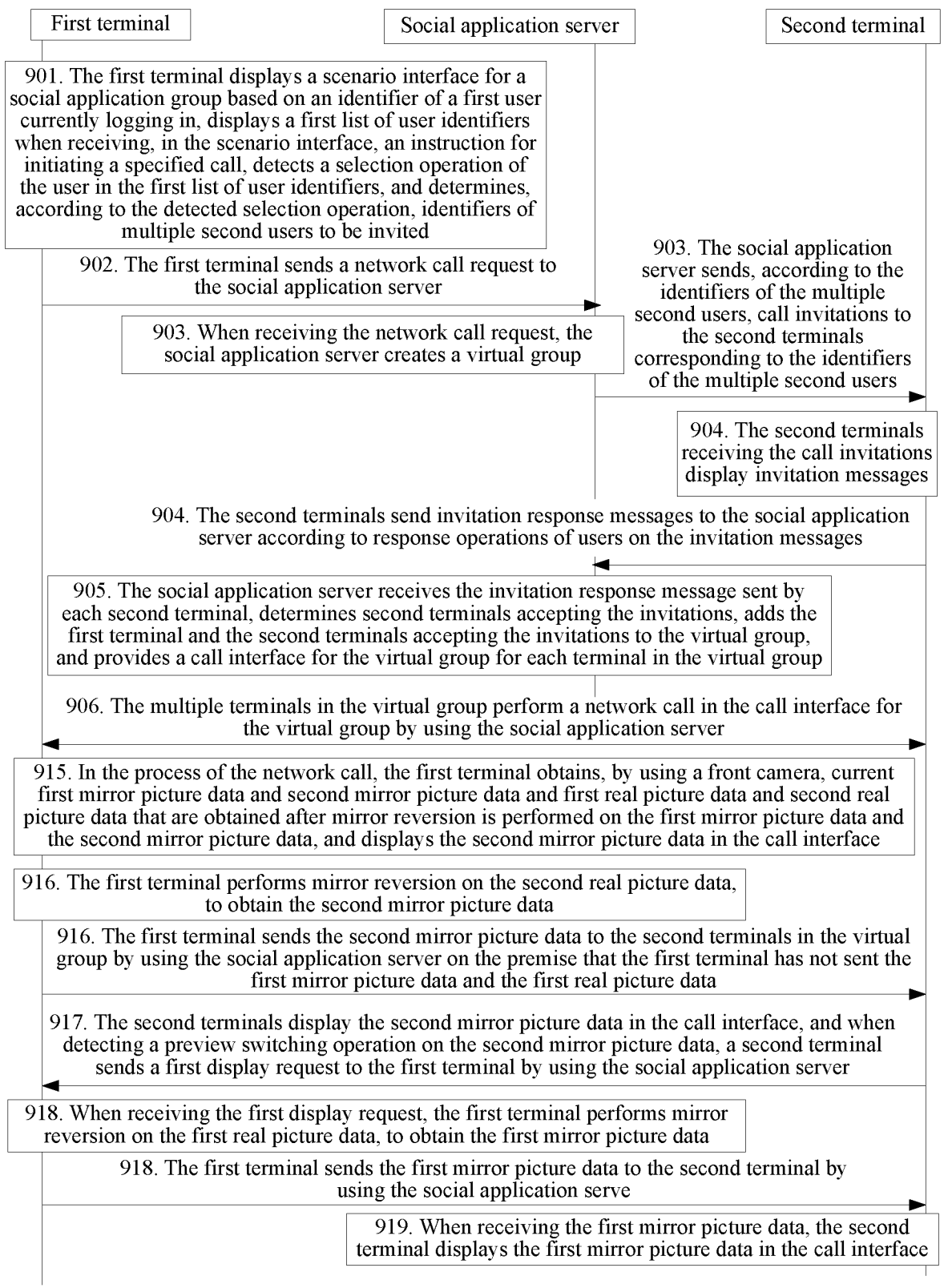
FIG. 9C is a flowchart of a network call method according to an embodiment of the present disclosure.

Further, to reduce data traffic consumed when the picture data is sent, and ensure that picture data in the call interface of the terminals performing the network call is the same, the foregoing steps 907 to 911 and steps 912 to 914 may be combined. That is, referring to FIG. 9C, after step 906, the method may further include the following steps 915 to 919:

915. In the process of the network call, the first terminal obtains, by using a front camera, current first mirror picture data and second mirror picture data and first real picture data and second real picture data that are obtained after mirror reversion is performed on the first mirror picture data and the second mirror picture data, and displays the second mirror picture data in the call interface.

The first mirror picture data and the first real picture data are first type of picture data, the second mirror picture data and the second real picture data are second type of picture data, and a data volume of the first type of picture data is greater than a data volume of the second type of picture data.

In addition, left and right directions of the first mirror picture data and left and right directions of the first real picture data are opposite, and left and right directions of the second mirror picture data and left and right directions of the second real picture data are opposite. However, content of the first mirror picture data and content of the first real picture data are the same, and content of the second mirror picture data and content of the second real picture data are the same.

916. The first terminal performs mirror reversion on the second real picture data, to obtain the second mirror picture data, and sends the second mirror picture data to the second terminals in the virtual group by using the social application server on the premise that the first terminal has not sent the first mirror picture data and the first real picture data.

917. The second terminals display the second mirror picture data in the call interface, and when detecting a preview switching operation on the second mirror picture data, a second terminal sends a first display request to the first terminal by using the social application server.

918. When receiving the first display request, the first terminal performs mirror reversion on the first real picture data, to obtain the first mirror picture data, and sends the first mirror picture data to the second terminal by using the social application server.

919. When receiving the first mirror picture data, the second terminal displays the first mirror picture data in the call interface.

When obtaining two types of mirror picture data and two types of real picture data, the first terminal displays the second mirror picture data in the call interface displayed by the first terminal, and performs mirror reversion on the second real picture data by default, to obtain the second mirror picture data, so that the second terminals also display the second mirror picture data. When receiving a first display request sent by a second terminal, which indicates that a user of the second terminal intends to view the first type of picture data of the first terminal, the first terminal performs mirror reversion on the first real picture data, to obtain the first mirror picture data, so that the second terminal displays the first mirror picture data in the call interface.

When the first terminal displays the second mirror picture data, and the second terminal displays the first mirror picture data, although display effects of the first mirror picture data and the second mirror picture data are different, content of the first mirror picture data and content of the second mirror picture data are the same, and communication between users is not affected.

By means of the method provided in this embodiment, a user can select, from a list of user identifiers, identifiers of users with which the user intends to perform a network call, and does not need to initiate a network call to each user in the social application group, thereby improving flexibility. Further, a social application server creates a virtual group, and multiple users perform a network call in a call interface for the virtual group, and a user in the social application group that has not joined the network call cannot learn the preceding of the network call, nor can join the network call, thereby improving privacy of the network call. Moreover, second picture data is sent to the social application server on the premise that first picture data has not been sent, thereby reducing data traffic. Further, mirror reversion is performed on obtained real picture data, to obtain mirror picture data, and then the mirror picture data is sent, thereby ensuring that picture data displayed by the terminals performing the network call is the same, and making it convenient for the users to communicate based on the mirror picture data.

Figure 10A:
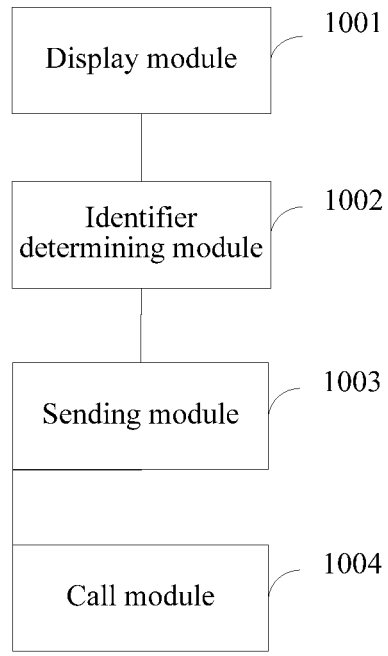
FIG. 10A is a schematic structural diagram a network call apparatus according to an embodiment of the present disclosure.

FIG. 10A is a schematic structural diagram a network call apparatus according to an embodiment of the present disclosure. Referring to FIG. 10A, the apparatus includes:
   a display module 1001, configured to display a scenario interface for a social application group that a first user has joined, the social application group including multiple user identifiers, where
   the display module 1001 is further configured to display a first list of user identifiers when an instruction for initiating a specified call is received in the scenario interface, the first list of user identifiers including multiple user identifiers;
   an identifier determining module 1002, configured to determine, according to a selection operation in the first list of user identifiers, identifiers of multiple second users to be invited;
   a sending module 1003, configured to send a network call request to a social application server, the network call request including an identifier of the first user logging in at a local end and the identifiers of the multiple second users, so that the social application server creates a virtual group, and adds, to the virtual group, the local end and second terminals corresponding to identifiers of second users accepting call invitations; and
   a call module 1004, configured to perform a network call in a call interface for the virtual group.

By means of the apparatus provided in this embodiment of the present disclosure, a list of user identifiers is displayed when an instruction for initiating a specified call is received in a scenario interface for a social application group, so that a user can select, from the list of user identifiers, identifiers of users with which the user is to perform a network call, and does not need to initiate a network call to each user in the social application group, thereby improving flexibility. Further, a social application server creates a virtual group, and multiple users perform a network call in a call interface for the virtual group, rather than performing a network call in the scenario interface for the social application group, and a user in the social application group that has not joined the network call cannot learn the preceding of the network call, nor can join the network call, thereby improving privacy of the network call.

Optionally, the display module 1001 is further configured to: obtain each user identifier in the social application group other than the identifier of the first user; and display each obtained user identifier.

Optionally, the display module 1001 is further configured to display a user relation chain of the identifier of the first user, where the user relation chain includes multiple user identifiers.

Optionally, the apparatus further includes:
   an instruction determining module, configured to determine, when a tap operation on a multi-person call option in the scenario interface is detected, that the instruction for initiating a specified call is received.
   Optionally, the display module 1001 is further configured to display a second list of user identifiers when a tap operation on a user adding option in the call interface is detected in the process of the network call, where the second list of user identifiers includes multiple user identifiers.
   The identifier determining module 1002 is further configured to determine, according to a selection operation in the second list of user identifiers, an identifier of at least one third user to be invited.
   The sending module 1003 is further configured to send a user adding request to the social application server based on the virtual group, where the user adding request includes the identifier of the at least one third user, so that the social application server adds, to the virtual group, a third terminal corresponding to an identifier of a third user accepting a call invitation.

All the foregoing optional technical solutions may form optional embodiments of the present disclosure in any combination, which are not enumerated herein.

Figure 10B:
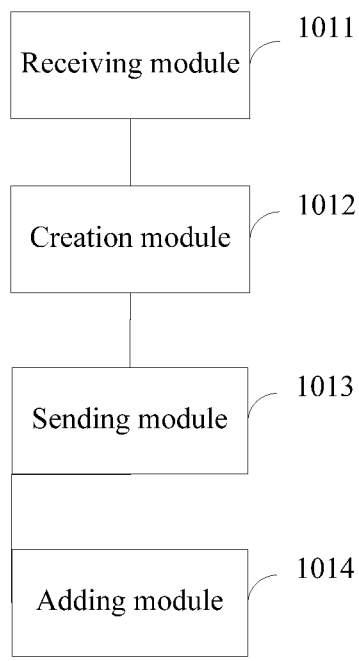
FIG. 10B is a schematic structural diagram a network call apparatus according to an embodiment of the present disclosure.

FIG. 10B is a schematic structural diagram a network call apparatus according to an embodiment of the present disclosure. Referring to FIG. 10B, the apparatus includes:
   a receiving module 1011, configured to receive a network call request sent by a first terminal, the network call request including an identifier of a first user currently logging in on the first terminal and identifiers of multiple second users to be invited;

a creation module 1012, configured to create a virtual group;

a sending module 1013, configured to send call invitations to second terminals corresponding to the identifiers of the multiple second users; and an adding module 1014, configured to add the first terminal and second terminals accepting the call invitations to the virtual group, so that the first terminal and the second terminals accepting the call invitations perform a network call in a call interface for the virtual group.

By means of the apparatus provided in this embodiment of the present disclosure, a virtual group is created when a network call request is received, so that multiple users can perform a network call in the virtual group, and do not need to perform a call in a social application group that has been created, thereby improving flexibility. Further, a user in the social application group that has not joined the network call cannot learn the preceding of the network call, nor can join the network call, thereby improving privacy of the network call.

Optionally, the apparatus further includes:

a terminal deletion module, configured to delete, when an exiting request sent by any terminal in the virtual group is received, the terminal sending the exiting request from the virtual group.

Optionally, the apparatus further includes:

a group deletion module, configured to delete the virtual group when a quantity of remaining terminals in the virtual group is less than a preset threshold.

All the foregoing optional technical solutions may form optional embodiments of the present disclosure in any combination, which are not enumerated herein.

Figure 11:
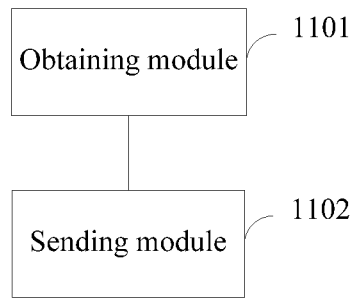
FIG. 11 is a schematic structural diagram a network call apparatus according to an embodiment of the present disclosure.

FIG. 11 is a schematic structural diagram a network call apparatus according to an embodiment of the present disclosure. Referring to FIG. 11, the apparatus includes:

an obtaining module 1101, configured to obtain current first picture data and second picture data in a process of a network call with a second terminal, the first picture data being first type of picture data, the second picture data being second type of picture data, and a data volume of the first type of picture data being greater than a data volume of the second type of picture data; and a sending module 1102, configured to send the second picture data to a social application server on the premise that the first picture data has not been sent, so that the social application server sends the second picture data to the second terminal, and the second terminal displays the second picture data in a call interface.

By means of the apparatus provided in this embodiment, in a process of a network call, first picture data having a larger data volume and second picture data having a smaller data volume are obtained, and the second picture data is sent to a social application server on the premise that the first picture data has not been sent, thereby reducing data traffic.

Optionally, the apparatus further includes:

a receiving module, configured to receive a first display request sent by the social application server, where the first display request is triggered by the second terminal, and the first display request is used to request displaying the first type of picture data, where the sending module 1102 is further configured to send the current first picture data to the social application server, so that the social application server sends the first picture data to the second terminal, and the second terminal displays the first picture data in the call interface.

Optionally, the apparatus further includes:

a receiving module, configured to receive fourth picture data of the second terminal, where the fourth picture data is forwarded by the social application server, and the fourth picture data is the second type of picture data; and a display module, configured to display the fourth picture data in the call interface, where the sending module 1102 is further configured to send the first display request to the social application server when a preview switching operation on the fourth picture data is detected, so that the social application server sends the first display request to the second terminal, and the second terminal returns current third picture data, where the third picture data is the first type of picture data; and the display module is further configured to display the third picture data in the call interface.

Optionally, the sending module 1102 is further configured to send a second display request to the social application server when a preview switching operation on the third picture data is detected, so that the social application server sends the second display request to the second terminal, and the second terminal returns the current fourth picture data; and the display module is further configured to display the fourth picture data in the call interface.

All the foregoing optional technical solutions may form optional embodiments of the present disclosure in any combination, which are not enumerated herein.

Figure 12:
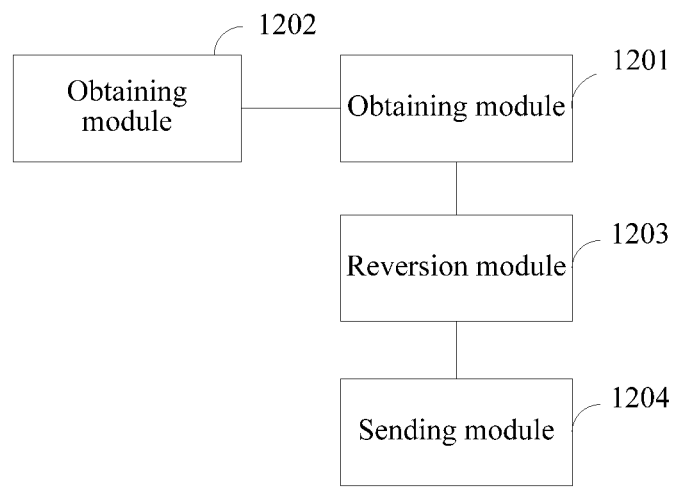
FIG. 12 is a schematic structural diagram a network call apparatus according to an embodiment of the present disclosure.

FIG. 12 is a schematic structural diagram a network call apparatus according to an embodiment of the present disclosure. Referring to FIG. 12, the apparatus includes:

an obtaining module 1201, configured to obtain, by using a front camera in a process of a network call with a second terminal, captured mirror picture data and real picture data that is obtained after mirror reversion is performed on the mirror picture data;

a display module 1202, configured to display the mirror picture data in a call interface;

a reversion module 1203, configured to perform mirror reversion on the real picture data, to obtain the mirror picture data; and a sending module 1204, configured to send the mirror picture data to a social application server, so that the social application server sends the mirror picture data to the second terminal, and the second terminal displays the mirror picture data in the call interface.

By means of the apparatus provided in this embodiment of the present disclosure, in a process of a network call with a second terminal, if mirror picture data is captured by using a front camera, the front camera performs mirror reversion on the mirror picture data, to obtain real picture data. When obtaining the real picture data, a first terminal first performs mirror reversion on the real picture data, to obtain the mirror picture data, and then sends the mirror picture data to the second terminal by using a social application server, so that the second terminal displays the mirror picture data. In this way, it is ensured that the picture data displayed by the second terminal is the same as the picture data displayed by the first terminal, thereby making it convenient for users to communicate based on the picture data.

Optionally, the apparatus further includes:
a receiving module, configured to receive real picture data that is obtained by the second terminal by using a front camera, where
the reversion module 1203 is further configured to perform mirror reversion on the real picture data, to obtain mirror picture data; and
the display module 1202 is further configured to display, in the call interface, the mirror picture data obtained by reversion.

Optionally, the apparatus further includes:
a display area determining module, configured to determine a display area, in the call interface, of each terminal performing the network call, where
the display module 1202 is further configured to display the mirror picture data of each terminal in the call interface according to the determined display area.

All the foregoing optional technical solutions may form optional embodiments of the present disclosure in any combination, which are not enumerated herein.

Figure 13:
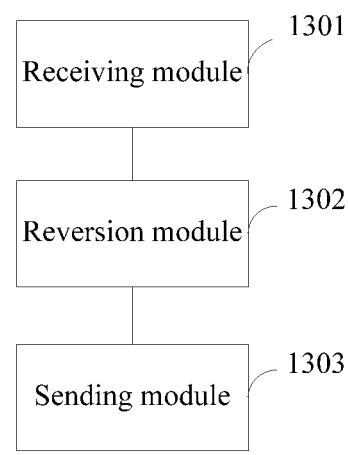
FIG. 13 is a schematic structural diagram a network call apparatus according to an embodiment of the present disclosure.

FIG. 13 is a schematic structural diagram a network call apparatus according to an embodiment of the present disclosure. Referring to FIG. 13, the apparatus includes:
a receiving module 1301, configured to receive, in a process in which a first terminal and a second terminal perform a network call, real picture data that is obtained by the first terminal by using a front camera, the real picture data being obtained by the front camera after performing mirror reversion on captured mirror picture data;
a reversion module 1302, configured to perform mirror reversion on the real picture data, to obtain the mirror picture data; and
a sending module 1303, configured to send the mirror picture data to the second terminal, so that the second terminal displays the mirror picture data in a call interface.

By means of the apparatus provided in this embodiment of the present disclosure, in a process in which a first terminal and a second terminal perform a network call, if the first terminal captures mirror picture data by using a front camera, the front camera performs mirror reversion on the mirror picture data, to obtain real picture data. When obtaining the real picture data by using the front camera, the first terminal first performs mirror reversion on the real picture data, to obtain the mirror picture data, and then sends the mirror picture data to the second terminal, so that the second terminal displays the mirror picture data. In this way, it is ensured that the picture data displayed by the second terminal is the same as the picture data displayed by the first terminal, thereby making it convenient for users to communicate based on the same picture data.

Optionally, the apparatus further includes:
a display area determining module, configured to determine, according to a quantity of the terminals performing the network call and a preset rule, a display area, in the call interface, of each terminal performing the network call, where
the sending module 1303 is further configured to send the determined display area to each terminal, so that each terminal displays the mirror picture data of each terminal in the call interface according to the determined display area.

It should be noted that, the division of the above functional modules is only used as an example for describing the network call apparatus provided in the foregoing embodiment. In actual application, the functions may be allocated to different functional modules according to specific needs. That is, the internal structures of the terminal and the server are divided into different functional modules to complete all or some of the above described functions. In addition, the network call apparatus provided in the foregoing embodiment is based on the same concept as the network call method in the foregoing embodiments. For the specific implementation process, refer to the method embodiments, and the details are not described herein again.

Figure 14:
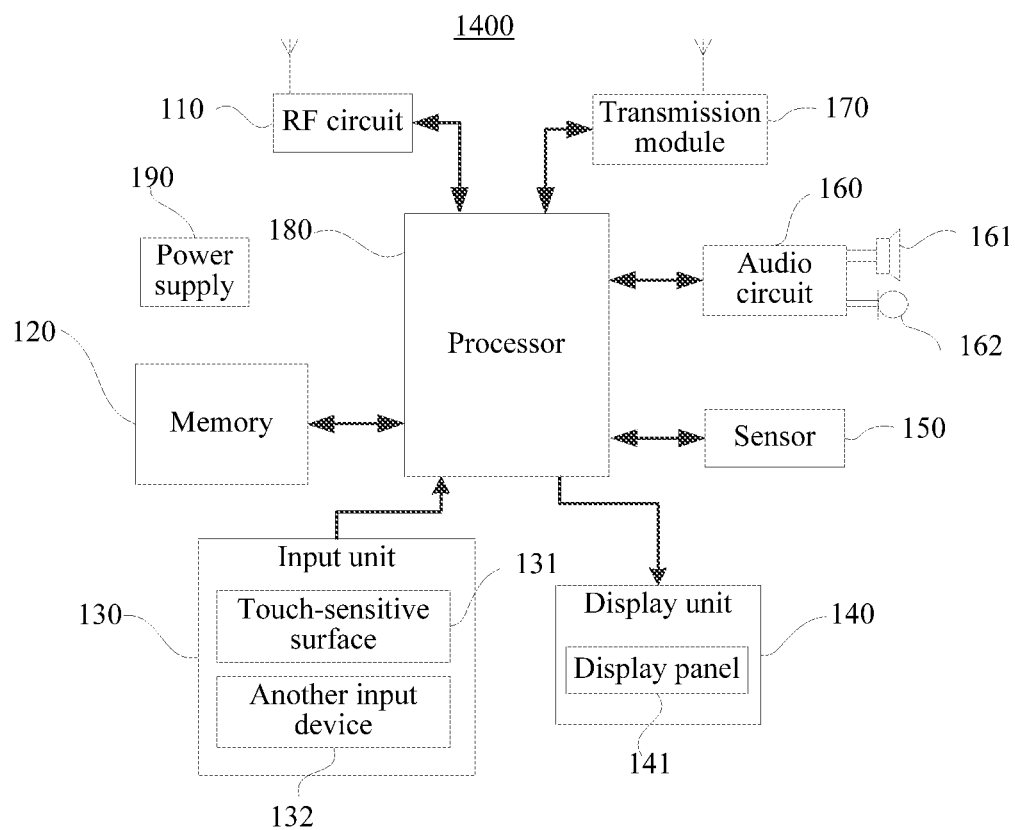
FIG. 14 is a schematic structural diagram of a terminal according to an embodiment of the present disclosure.

FIG. 14 is a schematic structural diagram of a terminal according to an embodiment of the present disclosure. The terminal may be configured to implement the functions of the terminal in the network call method in the foregoing embodiments. Specifically, The terminal 1400 may include components such as a radio frequency (RF) circuit 110, a memory 120 including one or more computer readable storage media, an input unit 130, a display unit 140, a sensor 150, an audio circuit 160, a transmission module 170, a processor 180 including one or more processing cores, and a power supply 190. A person skilled in the art can understand that the structure of the terminal shown in FIG. 14 does not constitute a limitation to the terminal, and the terminal may include more or fewer components than those shown in the figure, or some components may be combined, or a different component deployment may be used.

The RF circuit 110 may be configured to receive and send signals in an information receiving and sending process or a call process. Particularly, after receiving downlink information from a base station, the RF circuit 110 delivers the downlink information to one or more processors 180 for processing, and sends related uplink data to the base station. Generally, the RF circuit 110 includes, but is not limited to, an antenna, at least one amplifier, a tuner, one or more oscillators, a subscriber identity module (SIM) card, a transceiver, a coupler, a low noise amplifier (LNA), and a duplexer. In addition, the RF circuit 110 may also communicate with a network and another terminal by wireless communication. The wireless communication may use any communications standard or protocol, which includes, but is not limited to, Global System for Mobile communications (GSM), General Packet Radio Service (GPRS), Code Division Multiple Access (CDMA), Wideband Code Division Multiple Access (WCDMA), Long Term Evolution (LTE), e-mail, Short Messaging Service (SMS), and the like.

The memory 120 may be configured to store a software program and module, for example, the software program and the modules corresponding to the terminal shown in the foregoing exemplary embodiments. The processor 180 runs the software program and module stored in the memory 120, to implement various functional applications and data processing, for example, to implement video-based interaction. The memory 120 may mainly include a program storage area and a data storage area. The program storage area may store an operating system, an application program required by at least one function (such as a sound playback function and an image display function), and the like. The data storage area may store data (such as audio data and an address book) created according to use of the terminal 1400, and the like. In addition, the memory 120 may include a high speed random access memory, and may also include a non-volatile memory, for example, at least one magnetic disk storage device, a flash memory device, or another volatile solid-state storage device. Correspondingly, the memory 120 may further include a memory controller, so as to provide access of the processor 180 and the input unit 130 to the memory 120.

The input unit 130 may be configured to receive input digit or character information, and generate a keyboard, mouse, joystick, optical, or track ball signal input related to user setting and function control. Specifically, the input unit 130 may include a touch-sensitive surface 131 and another input terminal 132. The touch-sensitive surface 131, which is also referred to as a touch screen or a touch panel, may collect a touch operation of a user on or near the touch-sensitive surface (such as an operation of the user on or near the touch-sensitive surface 131 by using any suitable object or accessory such as a finger or a stylus), and drive a corresponding linked apparatus according to a preset program. Optionally, the touch-sensitive surface 131 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 180. In addition, the touch controller can receive and execute a command sent from the processor 180. In addition, the touch-sensitive surface 131 may be implemented by using a touch-sensitive surface of multiple types such as resistive, capacitive, infrared, and surface sound wave types. In addition to the touch-sensitive surface 131, the input unit 130 may further include the another input terminal 132. Specifically, the another input terminal 132 may include, but is not limited to, one or more of a physical keyboard, a functional key (such as a volume control key or a switch key), a track ball, a mouse, or a joystick.

The display unit 140 may be configured to display information input by the user or information provided to the user, and various graphical user interfaces of the terminal 1400. These graphical user interfaces may be formed by a graph, a text, an icon, a video, or any combination thereof. The display unit 140 may include a display panel 141. Optionally, the display panel 141 may be configured in a form of a liquid crystal display (LCD), an organic light-emitting diode (OLED) display, or the like. Further, the touch-sensitive surface 131 may cover the display panel 141. After detecting a touch operation on or near the touch-sensitive surface 131, the touch-sensitive surface 131 transfers the touch operation to the processor 180, so as to determine the type of the touch event. Then, the processor 180 provides a corresponding visual output on the display panel 141 according to the type of the touch event. Although the touch-sensitive surface 131 and the display panel 141 are used as two separate parts to implement input and output functions in FIG. 14, in some embodiments, the touch-sensitive surface 131 and the display panel 141 may be integrated to implement the input and output functions.

The terminal 1400 may further include at least one sensor 150, for example, an optical sensor, a motion sensor, and other sensors. Specifically, the optical sensor may include an ambient light sensor and a proximity sensor. The ambient light sensor can adjust luminance of the display panel 141 according to brightness of the ambient light. The proximity sensor can switch off the display panel 141 and/or enable backlight when the terminal 1400 is moved to the ear. As one type of motion sensor, a gravity acceleration sensor can detect magnitude of accelerations in various directions (generally on three axes), may detect magnitude and a direction of the gravity when the gravity acceleration sensor is still, and may be used for an application that recognizes the attitude of a mobile phone (for example, switching between landscape orientation and portrait orientation, a related game, and magnetometer attitude calibration), a function related to vibration recognition (such as a pedometer and a knock), and the like. Other sensors such as a gyroscope, a barometer, a hygrometer, a thermometer, and an infrared sensor, which may be provided on the terminal 1400, are not further described herein.

The audio circuit 160, a loudspeaker 161, and a microphone 162 may provide audio interfaces between a user and the terminal 1400. The audio circuit 160 may convert received audio data into an electric signal and transmit the electric signal to the loudspeaker 161. The loudspeaker 161 converts the electric signal into a sound signal for output. On the other hand, the microphone 162 converts a collected sound signal into an electric signal. The audio circuit 160 receives the electric signal and converts the electric signal into audio data, and outputs the audio data to the processor 180 for processing. Then, the processor 180 sends the audio data to, for example, another terminal by using the RF circuit 110, or outputs the audio data to the memory 120 for further processing. The audio circuit 160 may further include an earplug jack, so as to provide communication between a peripheral earphone and the terminal 1400.

The terminal 1400 may help, by using the transmission module 170, a user to receive and send e-mails, browse a webpage, access streaming media, and the like. The transmission module 170 provides wireless or wired broadband Internet access for the user. Although FIG. 14 shows the transmission module 170, it can be understood that the transmission module 170 is not a necessary component of the terminal 1400, and when required, the transmission module 170 may be omitted provided that the scope of the essence of the present disclosure is not changed.

The processor 180 is a control center of the terminal 1400, and is connected to various parts of the mobile phone by using various interfaces and lines. By running or executing the software program and/or module stored in the memory 120, and invoking data stored in the memory 120, the processor 180 performs various functions and data processing of the terminal 1400, thereby performing overall monitoring on the mobile phone. Optionally, the processor 180 may include one or more processing cores. Preferably, an application processor and a modem may be integrated in the processor 180. The application processor mainly processes an operating system, a user interface, an application program, and the like. The modem mainly processes wireless communication. It can be understood that the foregoing modem may also not be integrated in the processor 180.

The terminal 1400 further includes the power supply 190 (for example, a battery) for supplying power to the components. Preferably, the power supply may be logically connected to the processor 180 by using a power management system, thereby implementing functions such as charging, discharging, and power consumption management by using the power management system. The power supply 190 may further include one or more of a direct current or alternating current power supply, a re-charging system, a power failure detection circuit, a power supply converter or inverter, a power supply state indicator, and any other components.

Although not shown in the figure, the terminal 1400 may further include a camera, a Bluetooth module, and the like, which are not further described herein. Specifically, in this embodiment of the present disclosure, the display unit of the terminal is a touch screen display, and the terminal further includes a memory and one or more programs. The one or more programs are stored in the memory, and are configured to be executed by one or more processors to execute instructions, included in the foregoing one or more programs, used to perform the operations performed by the terminal in the foregoing embodiments.

In an exemplary embodiment, a non-transitory computer readable storage medium including instructions is further provided, for example, a memory including instructions, where the instructions may be executed by a processor of a mobile terminal to perform the foregoing network call method. For example, the non-transitory computer readable storage medium may be a ROM, a random access memory (RAM), a CD-ROM, a magnetic tape, a soft disk, an optical data storage device, or the like.

Figure 15:
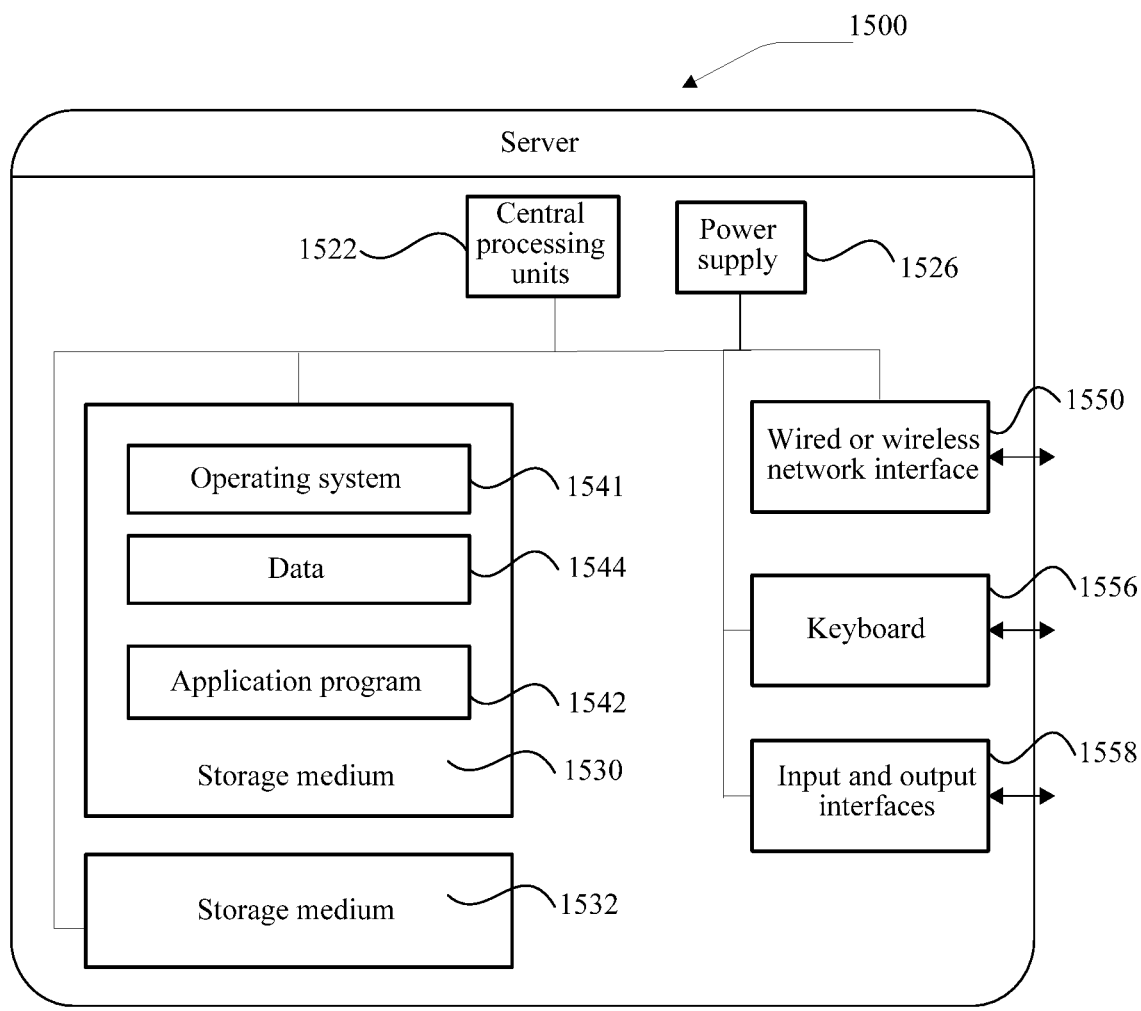
FIG. 15 is a schematic structural diagram of a server according to an embodiment of the present disclosure.

FIG. 15 is a schematic structural diagram of a server according to an embodiment of the present disclosure. The server 1500 may vary relatively greatly with different configurations or performance. The server 1500 may include one or more central processing units (CPU) 1522 (for example, one or more processors), a memory 1532, one or more storage media 1530 (for example, one or more mass storage devices) storing an application program 1542 or data 1544. The memory 1532 and the storage medium 1530 may be a transitory storage or a persistent storage. The program stored in the storage medium 1530 may include one or more modules (not shown in the figure), and each module may include a series of instructions and operations in the server. Further, the central processing unit 1522 may be configured to communicate with the storage medium 1530, and execute a series of instructions and operations in the storage medium 1530 on the server 1500.

The server 1500 may further include one or more power supplies 1526, one or more wired or wireless network interfaces 1550, one or more input and output interfaces 1558, one or more keyboards 1556, and/or one or more operating systems 1541, for example, Windows Server™, Mac OS X™, Unix™, Linux™, or FreeBSD™.

Figure 16:
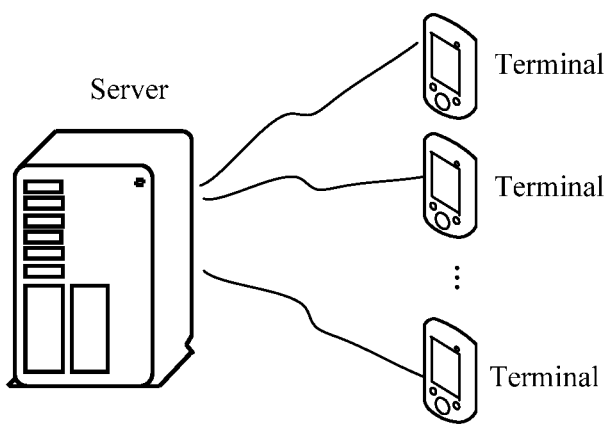
FIG. 16 is a schematic structural diagram a network call system according to an embodiment of the present disclosure.

FIG. 16 is a schematic structural diagram a network call system according to an embodiment of the present disclosure. Referring to FIG. 16, the network call system includes a social application server and multiple terminals, and the multiple terminals and the social application server are connected by using a network.

The network call system is configured to implement the network call method provided in any one of the foregoing embodiments.

By means of the method, the apparatus, the terminal, and the server provided in the embodiments of the present disclosure, a list of user identifiers is displayed when an instruction for initiating a specified call is received in a scenario interface, so that a user can select, from the list of user identifiers, identifiers of users with which the user is to perform a network call, and does not need to initiate a network call to each user in a social application group, thereby improving flexibility. Further, a social application server creates a virtual group, and multiple users perform a network call in a call interface for the virtual group, rather than performing a network call in the scenario interface for the social application group, and a user in the social application group that has not joined the network call cannot learn the preceding of the network call, nor can join the network call, thereby improving privacy of the network call.

A person of ordinary skill in the art may understand that all or some of the steps of the foregoing embodiments may be implemented by using hardware, or may be implemented by a program instructing relevant hardware. The program may be stored in a computer readable storage medium. The storage medium may be a read-only memory, a magnetic disk, an optical disc, or the like.

The foregoing descriptions are merely preferred embodiments of the present disclosure, and are not intended to limit the present disclosure. Any modification, equivalent replacement, or improvement made within the spirit and principle of the present disclosure shall fall within the protection scope of the present disclosure.

What is claimed is:

1. A network call method, applied to a first terminal including at least a memory and a processor, comprising:
displaying a scenario interface for a social application group that a first user has joined, the social application group including a first list of user identifiers;
displaying, in a first page of the scenario interface, a multi-person call button;
in response to triggering of the multi-person call button, switching the first page of the scenario interface to a second page of the scenario interface;
displaying, in the second page of the scenario interface, the first list of user identifiers when an instruction for initiating a specified call is received in the scenario interface;
determining, according to a selection operation in the first list of user identifiers, identifiers of second users to be invited;
concurrently displaying, in the second page of the scenario interface, the first list of user identifiers including the identifiers of the second users as selected and an identifier of another user not selected, and a start button, wherein the start button upon being triggered is to directly initiate a network call among the first user and the second users, without needing to have another social application group including only the first user and the second users created prior to initiation of the network call;
sending a network call request to a social application server via triggering the start button, the network call request including an identifier of the first user logging in at the first terminal locally and the identifiers of the second users, so that the social application server creates a virtual group, and adds, to the virtual group, the first terminal and second terminals corresponding to the identifiers of the second users accepting call invitations;
performing the network call in a call interface for the virtual group, wherein the virtual group is not a contact stored in any of the second terminals and wherein accordingly none of the second users in the virtual group is provided an entrance to reenter the call interface after exiting the network call while the network call is still in session, wherein performing the network call in the call interface includes:
in response to the triggering of the start button, switching the second page of the scenario interface to the call interface;
displaying, in the call interface, a minimize button; and
upon triggering of the minimize button, displaying at least a portion of the scenario interface and at least a portion of the call interface;
deleting one of the second users from the virtual group when the one of the second users sends an exiting request to the social application server; and
deleting the virtual group from the social application server when a quantity of remaining users in the virtual group is less than a preset threshold.

2. The method according to claim 1, comprising:
obtaining first picture data and second picture data in a process of the network call with a second terminal, the first picture data being first type of picture data, the second picture data being second type of picture data, and a data volume of the first type of picture data being greater than a data volume of the second type of picture data; and sending the second picture data to the social application server on a premise that the first picture data has not been sent, so that the social application server sends the second picture data to the second terminal for displaying.

3. The method according to claim 2, wherein after the sending the second picture data to the social application server on the premise that the first picture data has not been sent, the method further comprises:

receiving a first display request sent by the social application server, wherein the first display request is triggered by the second terminal, and the first display request is used to request displaying the first type of picture data; and sending the first picture data to the social application server, so that the social application server sends the first picture data to the second terminal for displaying.

4. The method according to claim 2, further comprising:

receiving fourth picture data of the second terminal, wherein the fourth picture data is forwarded by the social application server, and the fourth picture data is the second type of picture data;

displaying the fourth picture data in the call interface;

sending the first display request to the social application server when a preview switching operation on the fourth picture data is detected, so that the social application server sends the first display request to the second terminal, and the second terminal returns third picture data, wherein the third picture data is the first type of picture data; and displaying the third picture data in the call interface.

5. The method according to claim 4, wherein after the displaying the third picture data in the call interface, the method further comprises:

sending a second display request to the social application server when a preview switching operation on the third picture data is detected, so that the social application server sends the second display request to the second terminal, and the second terminal returns the fourth picture data, wherein the second display request is used to request displaying the second type of picture data; and displaying the fourth picture data in the call interface.

6. The method according to claim 1, further comprising:

obtaining, by using a first front camera of the first terminal in a process of the network call with a second terminal, captured mirror picture data and real picture data that is obtained after mirror reversion is performed on the mirror picture data;

displaying the mirror picture data in the call interface;

performing mirror reversion on the real picture data, to obtain the mirror picture data; and sending the mirror picture data to the social application server, so that the social application server sends the mirror picture data to the second terminal, and the second terminal displays the mirror picture data in the call interface.

7. The network call method according to claim 1, wherein one of the second terminals relating to one of the second users includes a screen, the method further comprising:

effecting display on the screen a second call interface while the network call is in progress for the virtual group, the screen being devoid of any screen icon indicative of the second call interface once the one of the second users exits the network call; and effecting display on the screen a second scenario interface, the screen being presented with a screen icon indicative of the second scenario interface as a second entrance via which the one of the second users reenters the second scenario interface after exiting the network call.

8. The method according to claim 1, further comprising:

in response to the triggering of the start button, switching the second page of the scenario interface to the call interface;

displaying, in the call interface, an add button; and upon triggering of the add button, adding to the virtual group a third terminal corresponding to a user identifier not included in the social application group.

9. A first terminal, comprising a processor, and a memory, the memory storing program code, and the processor being configured to call the program code to perform the following operations:

displaying a scenario interface for a social application group that a first user has joined, the social application group including multiple user identifiers;

displaying, in a first page of the scenario interface, a multi-person call button;

in response to triggering of the multi-person call button, switching the first page of the scenario interface to a second page of the scenario interface;

displaying, in the second page of the scenario interface, the first list of user identifiers when an instruction for initiating a specified call is received in the scenario interface;

determining, according to a selection operation in the first list of user identifiers, identifiers of second users to be invited;

concurrently displaying, in the second page of the scenario interface, both the first list of user identifiers including the identifiers of the second users as selected and an identifier of another user not selected, and a start button, wherein the start button upon being triggered is to directly initiate a network call among the first user and the second users, without needing to have another social application group including only the first user and the second users created prior to initiation of the network call;

sending a network call request to a social application server via triggering the start button, the network call request including an identifier of the first user logging in at the first terminal locally and the identifiers of the second users, so that the social application server creates a virtual group, and adds, to the virtual group, the first terminal and second terminals corresponding to the identifiers of the second users accepting call invitations;

performing the network call in a call interface for the virtual group, wherein the virtual group is not a contact stored in any of the second terminals and wherein accordingly none of the second users in the virtual group is provided an entrance to reenter the call interface after exiting the network call while the network call is still in session, wherein performing the network call in the call interface includes:

in response to the triggering of the start button, switching the second page of the scenario interface to the call interface;

displaying, in the call interface, a minimize button; and upon triggering of the minimize button, displaying at least a portion of the scenario interface and at least a portion of the call interface;

deleting one of the second users from the virtual group when the one of the second users sends an exiting request to the social application server; and deleting the virtual group from the social application server when a quantity of remaining users in the virtual group is less than a preset threshold.

10. The terminal according to claim 9, wherein the processor is configured to call the program code to perform the following operations:

obtaining first picture data and second picture data in a process of the network call with a second terminal, the first picture data being first type of picture data, the second picture data being second type of picture data, and a data volume of the first type of picture data being greater than a data volume of the second type of picture data; and sending the second picture data to the social application server on a premise that the first picture data has not been sent, so that the social application server sends the second picture data to the second terminal for displaying.

11. The terminal according to claim 10, wherein the processor is configured to call the program code to perform the following operations:

receiving a first display request sent by the social application server, wherein the first display request is triggered by the second terminal, and the first display request is used to request displaying the first type of picture data; and sending the first picture data to the social application server, so that the social application server sends the first picture data to the second terminal for displaying.

12. The terminal according to claim 10, wherein the processor is configured to call the program code to perform the following operations:

receiving fourth picture data of the second terminal, wherein the fourth picture data is forwarded by the social application server, and the fourth picture data is the second type of picture data;

displaying the fourth picture data in the call interface;

sending the first display request to the social application server when a preview switching operation on the fourth picture data is detected, so that the social application server sends the first display request to the second terminal, and the second terminal returns third picture data, wherein the third picture data is the first type of picture data; and displaying the third picture data in the call interface.

13. The terminal according to claim 12, wherein the processor is configured to call the program code to perform the following operations:

sending a second display request to the social application server when a preview switching operation on the third picture data is detected, so that the social application server sends the second display request to the second terminal, and the second terminal returns the fourth picture data, wherein the second display request is used to request displaying the second type of picture data; and displaying the fourth picture data in the call interface.

14. The terminal according to claim 9, wherein the processor is configured to call the program code to perform the following operations:

obtaining, by using a first front camera of the first terminal in a process of the network call with a second terminal, captured mirror picture data and real picture data that is obtained after mirror reversion is performed on the mirror picture data;

displaying the mirror picture data in the call interface;

performing mirror reversion on the real picture data, to obtain the mirror picture data; and sending the mirror picture data to the social application server, so that the social application server sends the mirror picture data to the second terminal, and the second terminal displays the mirror picture data in the call interface.

15. The terminal according to claim 14, wherein the processor is configured to call the program code to perform the following operations:

receiving real picture data that is obtained by the second terminal by using a second front camera of the second terminal;

performing mirror reversion on the real picture data, to obtain mirror picture data; and displaying, in the call interface, the mirror picture data obtained by reversion.

16. A non-transitory computer-readable storage medium storing computer program instructions executable by at least one processor of a first terminal to perform:

displaying a scenario interface for a social application group that a first user has joined, the social application group including a first list of user identifiers;

displaying in a first page of the scenario interface, a multi-person call button;

in response to triggering of the multi-person call button, switching the first page of the scenario interface to a second page of the scenario interface;

displaying, in the second page of the scenario interface, the first list of user identifiers when an instruction for initiating a specified call is received in the scenario interface;

determining, according to a selection operation in the first list of user identifiers, identifiers of second users to be invited;

concurrently displaying, in the second page of the scenario interface, both the first list of user identifiers including the identifiers of the second users as selected and an identifier of another user not selected, and a start button, wherein the start button upon being triggered is to directly initiate a network call among the first user and the second users, without needing to have another social application group including only the first user and the second users created prior to initiation of the network call;

sending a network call request to a social application server via triggering the start button, the network call request including an identifier of the first user logging in at the first terminal locally and the identifiers of the second users, so that the social application server creates a virtual group, and adds, to the virtual group, the first terminal and second terminals corresponding to the identifiers of the second users accepting call invitations;

performing the network call in a call interface for the virtual group, wherein the virtual group is not a contact stored in any of the second terminals and wherein accordingly none of the second users in the virtual group is provided an entrance to reenter the call interface after exiting the network call while the network call is still in session, wherein performing the network call in the call interface includes:

in response to the triggering of the start button, switching the second page of the scenario interface to the call interface;

displaying, in the call interface, a minimize button; and upon triggering of the minimize button, displaying at least a portion of the scenario interface and at least a portion of the call interface;

deleting one of the second users from the virtual group when the one of the second users sends an exiting request to the social application server; and deleting the virtual group from the social application server when a quantity of remaining users in the virtual group is less than a preset threshold.

* * * * *